US007313122B2

United States Patent
Yousef et al.

(10) Patent No.: US 7,313,122 B2
(45) Date of Patent: Dec. 25, 2007

(54) MULTI-USER CARRIER FREQUENCY OFFSET CORRECTION FOR CDMA SYSTEMS

(75) Inventors: Nabil R. Yousef, Foothill Ranch, CA (US); Jonathan S. Min, Buena Park, CA (US); Bruce J. Currivan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1262 days.

(21) Appl. No.: 10/225,963

(22) Filed: Aug. 22, 2002

(65) Prior Publication Data

US 2004/0008662 A1    Jan. 15, 2004

Related U.S. Application Data

(60) Provisional application No. 60/394,821, filed on Jul. 10, 2002.

(51) Int. Cl.
*H04B 7/216* (2006.01)

(52) U.S. Cl. .................... 370/342; 370/441; 455/278.1

(58) Field of Classification Search ............... 370/317; 455/114.2
See application file for complete search history.

(56) References Cited

U.S. PATENT DOCUMENTS

| | | | | |
|---|---|---|---|---|
| 5,659,583 A | * | 8/1997 | Lane | 375/346 |
| 5,920,599 A | * | 7/1999 | Igarashi | 375/341 |
| 6,396,804 B2 | * | 5/2002 | Odenwalder | 370/209 |
| 6,907,086 B2 | * | 6/2005 | Ojard | 375/299 |
| 6,980,602 B1 | * | 12/2005 | Kleinerman et al. | 375/262 |
| 7,050,419 B2 | * | 5/2006 | Azenkot et al. | 370/347 |
| 7,103,089 B2 | * | 9/2006 | Whight | 375/143 |
| 7,139,306 B2 | * | 11/2006 | Oates | 375/148 |
| 2002/0018454 A1 | * | 2/2002 | Misra et al. | 370/336 |
| 2002/0045433 A1 | * | 4/2002 | Vihriala | 455/313 |
| 2006/0182070 A1 | * | 8/2006 | Pan et al. | 370/335 |

* cited by examiner

*Primary Examiner*—Chi Pham
*Assistant Examiner*—Kevin Mew
(74) *Attorney, Agent, or Firm*—Garlick Harrison & Markison; Shayne X. Short

(57) ABSTRACT

"Multiple approaches are presented herein to perform CFO correction within CDMA systems having multiple users. Any communication receiver may be adapted to perform the CFO correction in this manner CDM. One approach assumes a diagonal CFO matrix to decouple the different codes' soft symbol decisions, and each soft symbol decision is independently corrected to obtain hard decisions. Another approach employs direct CFO matrix inversion and multiplies it by a despread soft symbol decision vector to obtain corrected soft symbol decisions. Another approach first performs a single-user correction on the despread soft symbol decisions so, which are then sliced to obtain initial hard decisions. In the next step of this particular approach the initial hard decisions are multiplied by the CFO coefficients to obtain an estimate for the undesired ICI, which is then subtracted from the despread soft symbol decisions to obtain cleaner soft symbol decisions, which then can undergo slicing."

57 Claims, 20 Drawing Sheets

Cellular Communication System 300

Cellular Communication System 400

Satellite Communication System 500

Microwave Communication System 600

High Definition Television (HDTV) Communication System 800

Communication System 900

Communication System 1000

CFO Estimation within a Communication Receiver 1300

Soft Symbol Decision Correction Processing 1500 (for Single User)

Soft Symbol Decision Correction Processing 1600 (using Direct Matrix inversion)

Soft Symbol Decision Correction Processing 1700 (using Successive Inter-Code Interference (ICI) Canceling)

Multi-User CFO Correction Method for CDMA Using Direct Matrix Inversion 1900

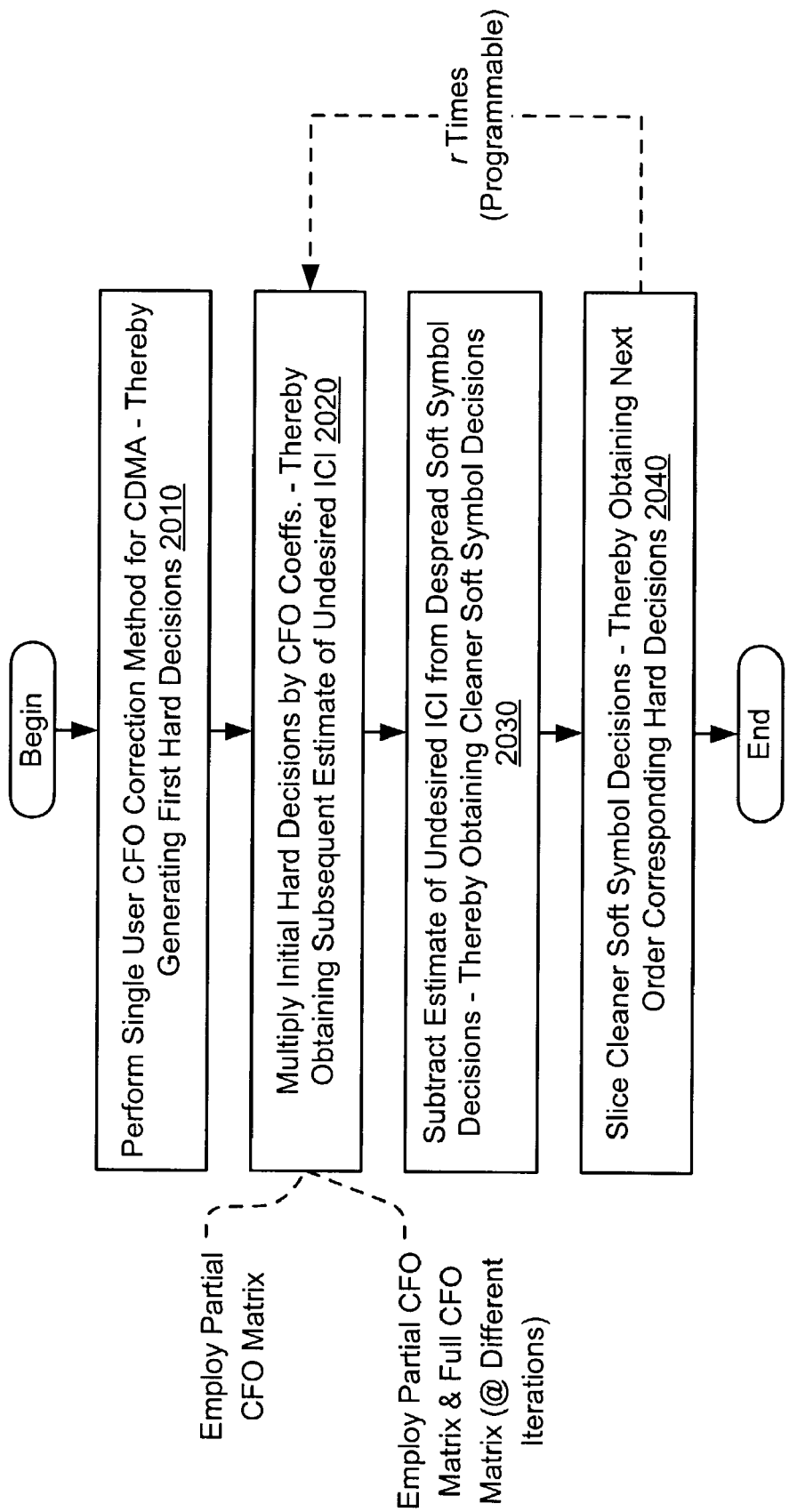

MULTI-USER CARRIER FREQUENCY OFFSET CORRECTION FOR CDMA SYSTEMS

CROSS REFERENCE TO RELATED APPLICATIONS

The present U.S. Utility Patent Application claims priority pursuant to 35 U.S.C. § 119(e) to U.S. Provisional Patent Application Ser. No. 60/394,821, entitled "MULTI-USER CARRIER FREQUENCY OFFSET CORRECTION FOR CDMA SYSTEMS," filed Jul. 10, 2002, pending, which is hereby incorporated herein by reference in its entirety and is made part of the present U.S. Utility Patent Application for all purposes.

TECHNICAL FIELD OF THE INVENTION

The invention relates generally to communication systems; and, more particularly, it relates to communication systems employing Code Division Multiple Access (CDMA).

BACKGROUND OF THE INVENTION

Data communication systems have been under continual development for many years. There is oftentimes difficulty in accommodating the offset, or differences, of the operational frequencies between the various devices within a communication system. Carrier frequency offsets (CFOs) are very common in data communications systems, in that, two or more devices operate at frequencies that are slightly different. When there is a CFO between a transmitter and a receiver within a communication system, there may be significant degradation in performance. The undesirable degradation in performance may result in an inability to demodulate and decode received data. In extreme situations, the existence of CFO may result in a complete inoperability of the communication system.

In order to correct for CFOs, an accurate estimate of the CFO is needed. In packet based communication systems, a known preamble sequence is transmitted with each data packet. The received sequence and the known preamble are typically used at the receiver to estimate the CFO. The prior art includes various methods and approaches that may be used to achieve an estimate of the CFO; however, these prior art methods and approaches typically involve a high degree of computational complexity. This high degree of computational complexity oftentimes prohibits their implementation. In addition, these prior art methods and approaches often fail to provide for a sufficiently high degree of accuracy. The combination of a high degree of computational complexity and relatively low accuracy provides even further motivation for not implementing these prior art approaches. As such, accurate estimates of CFOs may typically not be achieved in most prior art communication systems. This results in a failure to achieve optimal performance and accurate system operation.

When an accurate estimate of the CFO may in fact be achieved, the CFO estimate may then be used at the receiver to correct for the CFO. Prior art approaches to compensate for this CFO, in a receiver, are typically inadequate to provide for sufficient system performance. As with the estimation of the CFO, the prior art CFO correction techniques are also typically extremely computationally intensive and costly. As such, CFO correction if oftentimes not performed at all within a communication system, and a significant degradation of performance is often the result.

One particular type of communication system, a cable modem (CM) communication system, has been under continual development for the last several years. There has been development to try to provide for improvements in the manner in which communications between the CM users and a cable modem termination system (CMTS) is performed. Many of these prior art approaches seek to perform and provide broadband network access to a number of CM users.

CM communication systems are realized when a cable company offers network access, typically Internet, access over the cable. This way, the Internet information can use the same cables because the CM communication system puts downstream data, sent from the Internet to an individual computer having CM functionality, into a communication channel having a 6 MHz bandwidth capacity. The reverse transmission is typically referred to as upstream data, information sent from an individual back to the Internet, and this typically requires even less of the cable's bandwidth. Some estimates say only 2 MHz of bandwidth is required for the upstream data transmission, since the assumption is that most people download far more information than they upload.

Putting both upstream and downstream data on the cable television system requires two types of equipment: a cable modem on the customer end and the CMTS at the cable provider's end. Between these two types of equipment, all the computer networking, security and management of Internet access over cable television is put into place. This intervening region may be referred to as a CM network segment, and a variety of problems can occur to signals sent across this CM network segment. This represents just one of the many situations where a CFO may exist between two different devices, specifically, between the cable modem on the customer end and the CMTS at the cable provider's end.

One particular deficiency that may arise within the CM network segment is the undesirable introduction of a CFO in the expected clock frequency sent from the CMs within the CM communication system to the CMTS. Again, although there do exist some approaches in the prior art to try to estimate this CFO, but these prior art approaches typically fail to provide an efficient solution. As in the general prior art application of trying to perform CFO estimation, these prior art methods and approaches typically involve a high degree of computational complexity. In addition, these prior art methods and approaches often fail to provide for a high degree of accuracy. In order to correct for CFOs, an accurate estimate of the CFO is needed. In packet based communication systems, a known preamble sequence is transmitted with each data packet. The received sequence and the known preamble are usually used at the receiver side to estimate the CFO. However, in many cases, the preamble might not be long enough to obtain the needed accuracy for the CFO estimate. In all of these deficient prior art approaches that seek to perform CFO estimation, any subsequently performed CFO correction is likewise deficient, in that, the prior art CFO correction approach uses a relatively inaccurate CFO estimate.

These CFOs can lead to significant performance degradation in CDMA systems. These offsets can result in loss of orthogonality in the CDMA codes, especially for synchronized CDMA (S-CDMA) systems, which can cause significant inter-code-interference (ICI) that can become a limiting performance factor. The CFO between each two devices is usually estimated using preamble and/or data symbols contained within the transmitted data.

It is noted here that within Time Division Multiple Access (TDMA) communication systems, this problem of correcting for CFO does not exist in the same context of CDMA, as different users' codes are orthogonal even in the presence of CFOs. Thus, any single-user carrier frequency offset correction technique would be adequate within TDMA communication systems.

As such, there exists in need in the art to provide for a more efficient way to perform estimation and correction of CFOs existent within the signals communicated between devices.

SUMMARY OF THE INVENTION

Various aspects of the invention can be found in a communication system having a receiver that is operable to support and/or perform multi-user CFO correction for CDMA systems. The invention presents several solutions that may be performed individually or in conjunction with one another. The invention is operable to provide techniques for multi-user CFO correction for CDMA systems. The operation of the invention may be described as follows: a received signal is despread and buffered.

An initial estimate of the CFO is obtained in any number of ways in accordance with the invention. For example, using a received preamble sequence, an initial estimate of the CFO is obtained in one embodiment. This estimate is used to generate a number of CFO coefficients. These CFO coefficients form a CFO matrix. Corrected soft symbol decisions are then computed from the despread soft symbol decisions using the CFO matrix coefficients in one of at least three ways. It is noted here that the symbols described herein may include as few as one bit per symbol and as many as several bits per symbol. The invention is adaptable to deal with signals modulated using binary modulation as well as n-bit per symbol modulation.

Using a first technique, a single user correction technique is performed by assuming a diagonal CFO matrix; this approach ignores the effects of ICI between the codes of the various users. This approach involves independently correcting for each soft symbol decision using the carrier frequency offset contribution for corresponding code. That is to say, the off diagonal elements are assumed to be zero valued elements. This first technique will not be a most accurate approach, but it will be a very computationally efficient approach. The soft symbol decisions for the different codes will therefore be decoupled and each soft symbol decision may then be independently corrected and then used to obtain a corresponding hard decision. This approach may be used in conjunction with one of the other methods described below without departing from the scope and spirit of the invention.

Using a second technique, a direct matrix inversion of the CFO matrix is performed and multiplied by a despread soft symbol decision vector to obtain corrected soft symbol decisions. This second approach is relatively computationally burdensome compared to the other embodiments provided by the invention, but it is nevertheless extremely accurate. When a system involves sufficient computational resources, then this approach may selectively be used to provide for a most accurate correction of CFO between devices.

Using a third technique provided by the invention, a single-user correction is first performed on the despread soft symbol decisions, which are then sliced to obtain initial hard decisions. In the next step of this third technique, the initial hard decisions are multiplied by the CFO coefficients to obtain an estimate for the undesired ICI, which is then subtracted from the despread soft symbol decisions to obtain cleaner soft symbol decisions. The cleaner soft symbol decisions are sliced to obtain next-order hard decisions; these next-order hard decisions would be second-order when one iteration of this approach is performed. However, this third technique may be repeated iteratively to enhance the accuracy of the obtained soft symbol decisions in each step. The second technique described above generally has a better performance than the third, while the third is less complex as it avoids the matrix inversion operation. There may be embodiments and implementations that warrant using the third technique where a higher level of performance is desired, yet the processing resources simply do not provide the ability to perform the direct matrix inversion process of the second technique. It is also noted that the various techniques may all be supported within a single device or system, and the particular technique may be selected based on the available processing resources within the system or device.

In addition, other aspects, advantages and novel features of the invention will become apparent from the following detailed description of the invention when considered in conjunction with the accompanying drawings.

BRIEF DESCRIPTION OF THE DRAWINGS

A better understanding of the invention can be obtained when the following detailed description of various exemplary embodiments is considered in conjunction with the following drawings.

FIG. 20 is an operational flow diagram illustrating an embodiment of a multi-user CFO correction method for CDMA using successive ICI canceling that is performed according to the invention.

DETAILED DESCRIPTION OF A PREFERRED EMBODIMENT

Figure 1:
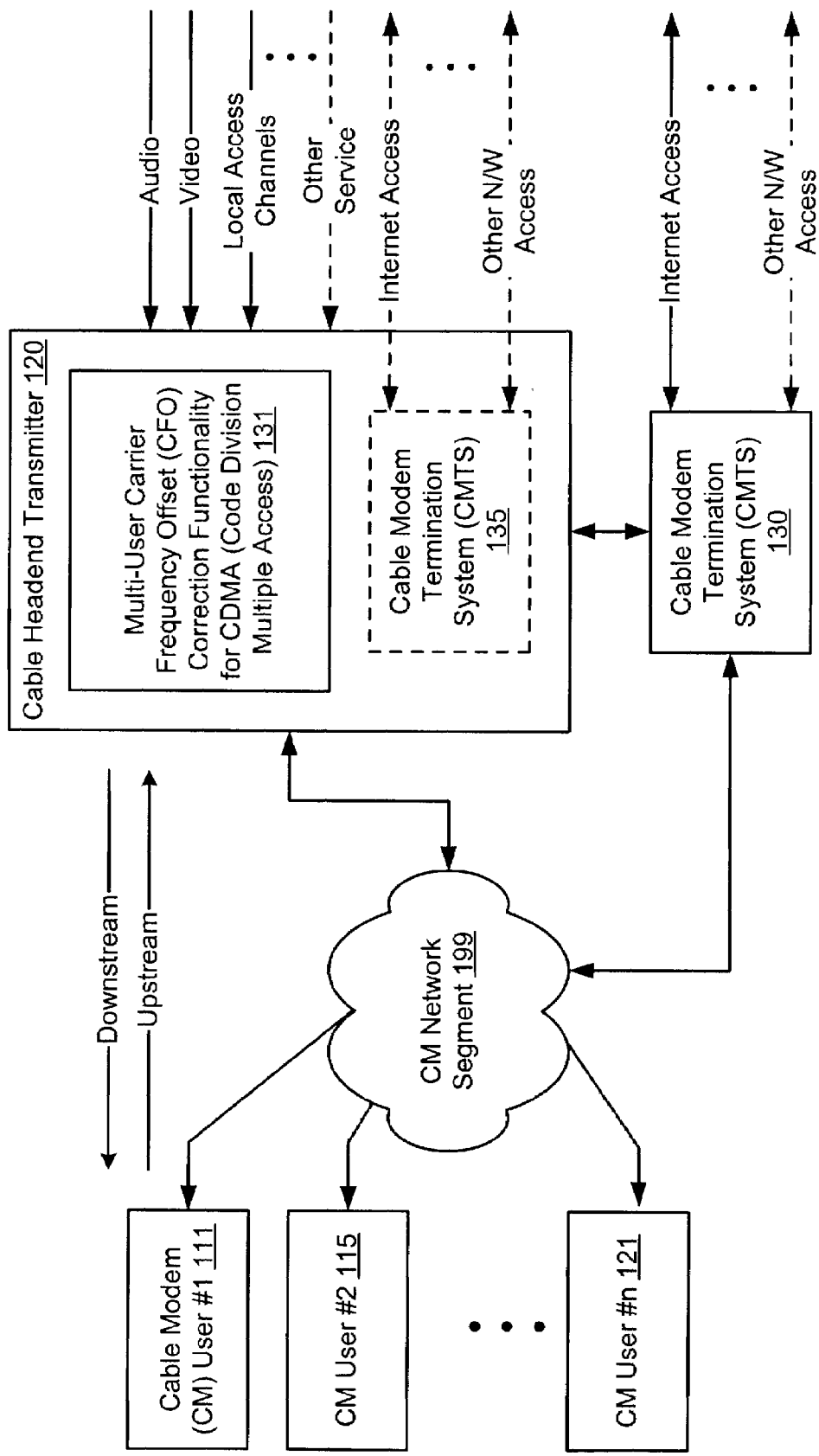
FIG. 1 is a system diagram illustrating an embodiment of a cable modem (CM) communication system that is built according to the invention.

FIG. 1 is a system diagram illustrating an embodiment of a CM communication system 100 that is built according to the invention. The CM communication system includes a number of CMs used by various CM users (shown as a CM user #1 111, a CM user #2 115, . . . , and a CM user #n 121) and a CMTS 130. The CMTS 130 is a component that exchanges digital signals with CMs on a cable network.

Each of a number of CM users 111, 115, . . . , and 121, is operable to communicatively couple to a CM network segment 199. A number of elements may be included within the CM network segment 199. For example, routers, splitters, couplers, relays, and amplifiers may be contained within the CM network segment 199 without departing from the scope and spirit of the invention.

The CM network segment 199 allows communicative coupling between a CM user and a cable headend transmitter 120 and/or a CMTS 130. In some embodiments, a cable CMTS is in fact contained within a headend transmitter. In other embodiments, a cable CMTS is located externally with respect to a headend transmitter. For example, the CMTS 130 may be located externally to the cable headend transmitter 120. In alternative embodiments, a CMTS 135 may be located within the cable headend transmitter 120. The CMTS 130 may be located at a local office of a cable television company or at another location within a CM communication system. In the following description, the CMTS 130 is used for illustration; yet, the same functionality and capability as described for the CMTS 130 may equally apply to embodiments that alternatively employ the CMTS 135. The cable headend transmitter 120 is able to provide a number of services including those of audio, video, local access channels, as well as any other service known in the art of cable systems. Each of these services may be provided to the one or more CM users 111, 115, . . . , and 121.

In addition, through the CMTS 130, the CM users 111, 115, . . . , 121 are able to transmit and receive data from the Internet, . . . , and/or any other network to which the CMTS 130 is communicatively coupled. The operation of a CMTS, at the cable-provider's head-end, may be viewed as providing analogous functions provided by a digital subscriber line access multiplexor (DSLAM) within a digital subscriber line (DSL) system. The CMTS 130 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users, and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users without departing from the scope and spirit of the invention.

The downstream information flows to all of the connected CM users 111, 115, . . . , 121. The individual network connection, within the CM network segment 199, decides whether a particular block of data is intended for it or not. On the upstream side, information is sent from the CM users 111, 115, . . . , 121 to the CMTS 130; on this upstream transmission, the users within the CM users 111, 115, . . . , 121 to whom the data is not intended do not see that data at all. As an example of the capabilities provided by a CMTS, the CMTS will enable as many as 1,000 users to connect to the Internet through a single 6 MHz channel. Since a single channel is capable of 30-40 megabits per second of total throughput, this means that users may see far better performance than is available with standard dial-up modems. Some embodiments implementing the invention are described below and in the various Figures that show the data handling and control within one or both of a CM and a CMTS within a CM system that operates by employing S-CDMA (Synchronous Code Division Multiple Access).

The CMs of the CM users 111, 115, . . . , 121 and the CMTS 130 communicate synchronization information to one another to ensure proper alignment of transmission from the CM users 111, 115, . . . , 121 to the CMTS 130. This is where the synchronization of the S-CDMA communication systems is extremely important. When a number of the CMs all transmit their signals at a same time such that these signals are received at the CMTS 130 on the same frequency and at the same time, they must all be able to be properly despread and decoded for proper signal processing.

Each of the CMs users 111, 115, . . . , 121 is located a respective transmit distance from the CMTS 130. In order to achieve optimum spreading diversity and orthogonality for the CMs users 111, 115, . . . , 121 to transmission of the CMTS 130, each of the CM transmissions must be synchronized so that it arrives, from the perspective of the CMTS 130, synchronous with other CM transmissions. In order to achieve this goal, for a particular transmission cycle, each of the CMs 111, 115, . . . , 121 will typically transmit to the CMTS 130 at a respective transmission time, which will likely differ from the transmission times of other CMs.

These differing transmission times will be based upon the relative transmission distance between the CM and the CMTS 130. These operations may be supported by the determination of the round trip delays (RTPs) between the CMTS 130 and each supported CM. With these RTPs determined, the CMs may then determine at what point to transmit their S-CDMA data so that all CM transmissions will arrive synchronously at the CMTS 130.

The invention enables multi-user CFO correction functionality for CDMA between each of the CM users (CMs users 111, 15, . . . , 121) within the CMTS 130. This multi-user CFO correction functionality for CDMA is shown as within a functional block 131 within the cable headend transmitter 120. This multi-user CFO correction functionality for CDMA may also be supported within the CMTS 135 and/or the CMTS 130, whichever may be implemented within a particular embodiment. All of the functionality described herein may be performed within the context of the CM communication system of the FIG. 1. The FIG. 1 shows just one embodiment where the various aspects of the invention may be implemented. Several other embodiments are described as well.

Figure 2:
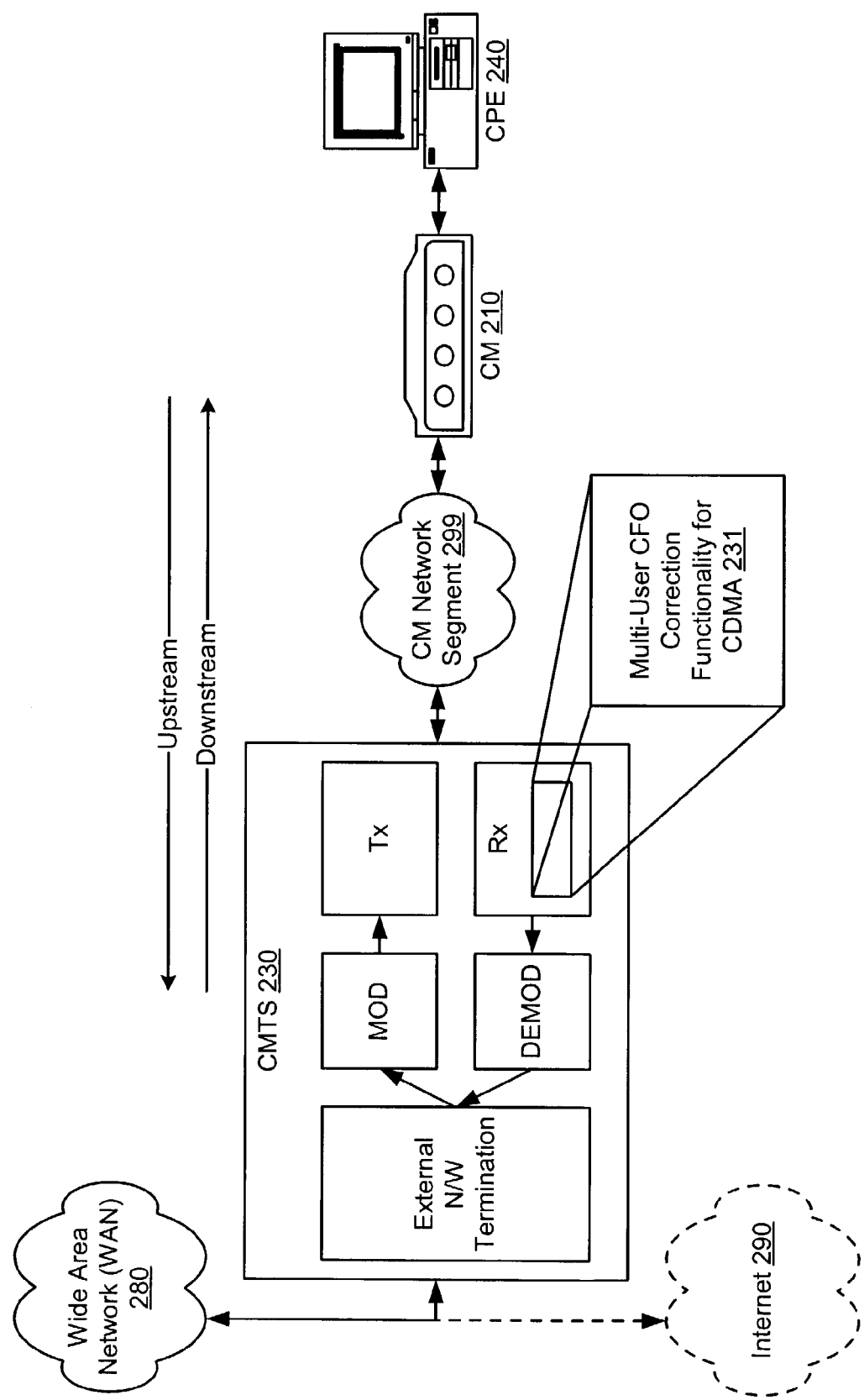
FIG. 2 is a system diagram illustrating another embodiment of a CM communication system that is built according to the invention.

FIG. 2 is a system diagram illustrating another embodiment of a CM communication system 200 that is built according to the invention. From certain perspectives, the FIG. 2 may be viewed as a communication system allowing bi-directional communication between a customer premise equipment (CPE) 240 and a network. In some embodiments, the CPE 240 is a personal computer or some other device allowing a user to access an external network. The external network may be a wide area network (WAN) 280, or alternatively, the Internet 290 itself. For example, the CM communication system 200 is operable to allow Internet protocol (IP) traffic to achieve transparent bi-directional transfer between a CMTS-network side interface (CMTS-NSI: viewed as being between the CMTS 230 and the Internet 290) and a CM to CPE interface (CMCI: viewed as being between the CM 210 and the CPE 240).

The WAN 280, and/or the Internet 290, is/are communicatively coupled to the CMTS 230 via the CMTS-NSI. The CMTS 230 is operable to support the external network termination, for one or both of the WAN 280 and the Internet 290. The CMTS 230 includes a modulator and a demodulator to support transmitter and receiver functionality to and from a CM network segment 299. The receiver functionality within the CMTS 230 is operable to support multi-user CFO correction functionality for CDMA 231 according to the invention.

A number of elements may be included within the CM network segment 299. For example, routers, splitters, couplers, relays, and amplifiers may be contained within the CM network segment 299 without departing from the scope and spirit of the invention. The CM network segment 299 allows communicative coupling between a CM user and the CMTS 230.

Figure 3:
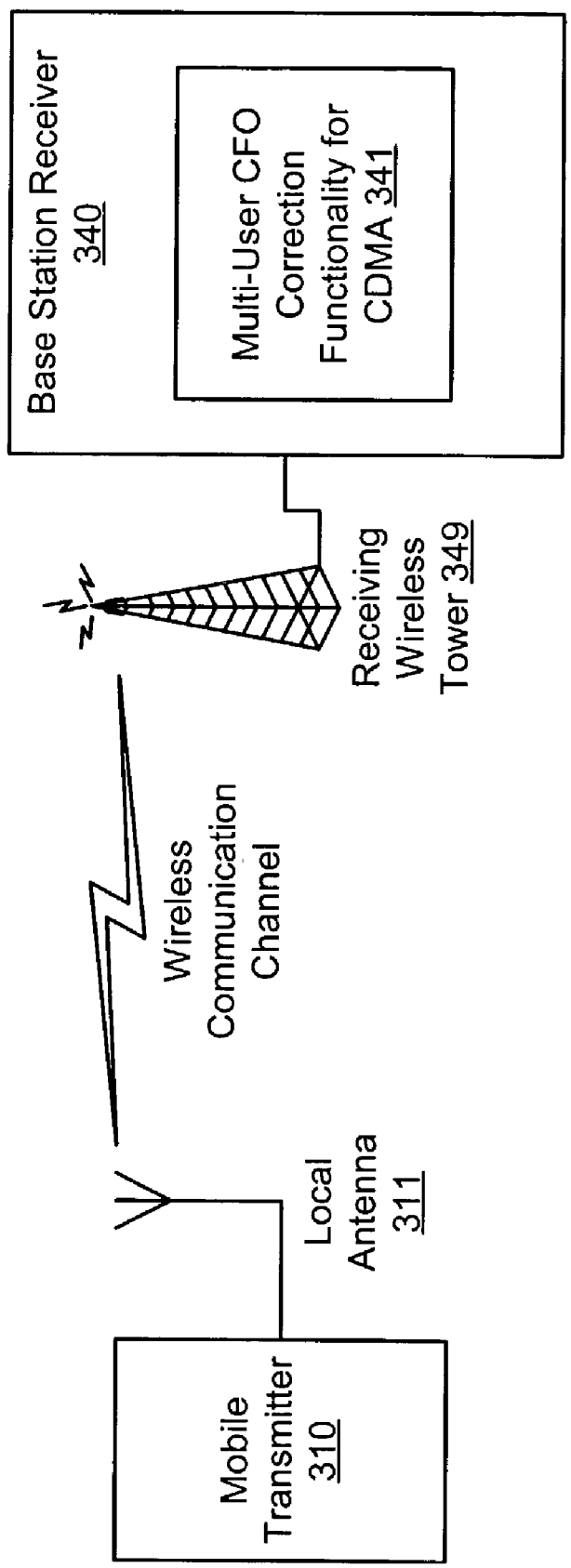
FIG. 3 is a system diagram illustrating an embodiment of a cellular communication system that is built according to the invention.

FIG. 3 is a system diagram illustrating an embodiment of a cellular communication system 300 that is built according to the invention. A mobile transmitter 310 has a local antenna 311. The mobile transmitter 310 may be any number of types of transmitters including a cellular telephone, a wireless pager unit, a mobile computer having transmit functionality, or any other type of mobile transmitter. The mobile transmitter 310 transmits a signal, using its local antenna 311, to a base station receiver 340 via a wireless communication channel. The base station receiver 340 is communicatively coupled to a receiving wireless tower 349 that is able to receive transmissions from the local antenna 311 of the mobile transmitter 310 that have been communicated via the wireless communication channel. The receiving wireless tower 349 communicatively couples the received signal to the base station receiver 340.

The base station receiver 340 is then able to support multi-user CFO correction functionality for CDMA according to the invention, as shown in a functional block 341, on the received signal. The FIG. 3 shows just one of the many embodiments where multi-user CFO correction functionality for CDMA, performed according to the invention, may be performed to provide for improved operation within a communication system.

Figure 4:
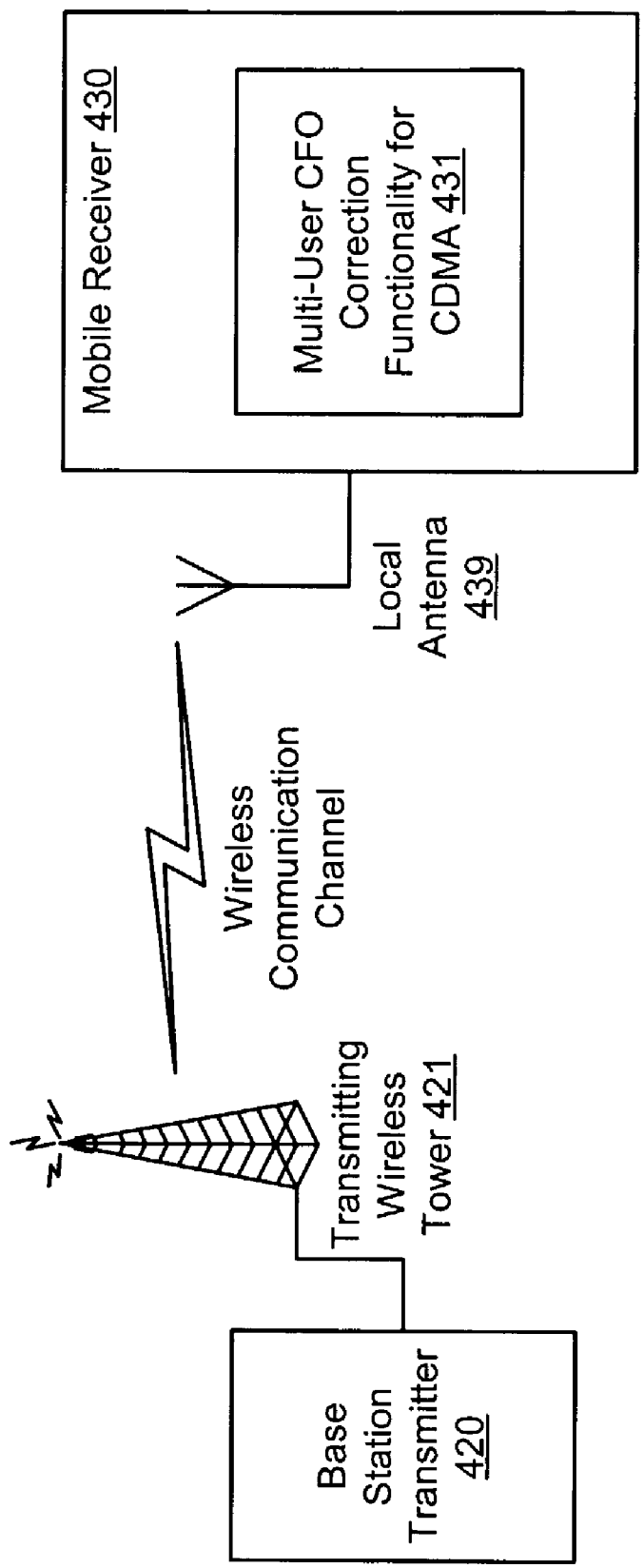
FIG. 4 is a system diagram illustrating another embodiment of a cellular communication system that is built according to the invention.

FIG. 4 is a system diagram illustrating another embodiment of a cellular communication system that is built according to the invention. From certain perspectives, the FIG. 4 may be viewed as being the reverse transmission operation of the cellular communication system 300 of the FIG. 3. A base station transmitter 420 is communicatively coupled to a transmitting wireless tower 421. The base station transmitter 420, using its transmitting wireless tower 421, transmits a signal to a local antenna 439 via a wireless communication channel. The local antenna 439 is communicatively coupled to a mobile receiver 430 so that the mobile receiver 430 is able to receive transmission from the transmitting wireless tower 421 of the base station transmitter 420 that have been communicated via the wireless communication channel. The local antenna 439 communicatively couples the received signal to the mobile receiver 430. It is noted that the mobile receiver 430 may be any number of types of transmitters including a cellular telephone, a wireless pager unit, a mobile computer having transmit functionality, or any other type of mobile transmitter.

The mobile receiver 430 is then able to support multi-user CFO correction functionality for CDMA according to the invention, as shown in a functional block 431, on the received signal. The FIG. 4 shows just one of the many embodiments where the multi-user CFO correction functionality for CDMA, performed according to the invention, may be performed to provide for improved operation within a communication system.

Figure 5:
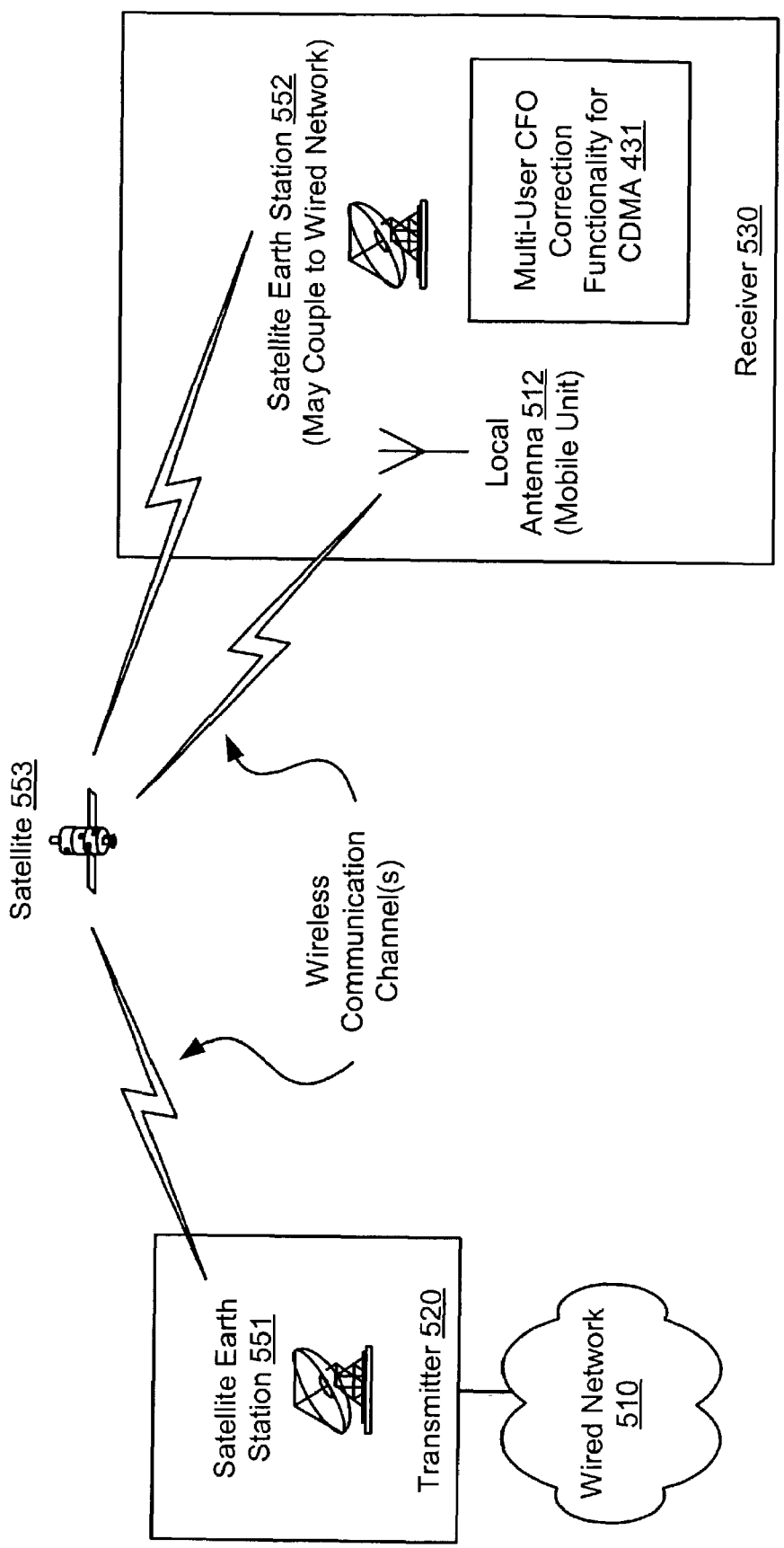
FIG. 5 is a system diagram illustrating an embodiment of a satellite communication system that is built according to the invention.

FIG. 5 is a system diagram illustrating an embodiment of a satellite communication system 500 that is built according to the invention. A transmitter 520 is communicatively coupled to a wired network 510. The wired network 510 may include any number of networks including the Internet, proprietary networks, . . . , and other wired networks. The transmitter 520 includes a satellite earth station 551 that is able to communicate to a satellite 553 via a wireless communication channel. The satellite 553 is able to communicate with a receiver 530. In this embodiment, the receiver 530 is also located on the earth. Here, the communication to and from the satellite 553 may cooperatively be viewed as being a wireless communication channel, or each of the communication to and from the satellite 553 may be viewed as being two distinct wireless communication channels.

For example, the wireless communication "channel" may be viewed as not including multiple wireless hops in one embodiment. In other embodiments, the satellite 553 receives a signal received from the satellite earth station 551, amplifies it, and relays it to the receiver 530; the receiver 530 may include terrestrial receivers such as satellite receivers, satellite based telephones, . . . , and satellite based Internet receivers, among other receiver types. In the case where the satellite 553 receives a signal received from the satellite earth station 551, amplifies it, and relays it, the satellite 553 may be viewed as being a "transponder." In addition, other satellites may exist (and operate in conjunction with the satellite 553) that perform both receiver and transmitter operations. In this case, each leg of an up-down transmission via the wireless communication channel would be considered separately. Clearly, a wireless communication channel between the satellite 553 and a fixed earth station would likely be less time-varying than the wireless communication channel between the satellite 553 and a mobile station.

In whichever embodiment is implemented, the satellite 553 communicates with the receiver 530. The receiver 530 may be viewed as being a mobile unit in certain embodiments (employing a local antenna 512); alternatively, the receiver 530 may be viewed as being a satellite earth station 552 that may be communicatively coupled to a wired network in a similar manner that the satellite earth station 551, within the transmitter 520, communicatively couples to the wired network 510. In either of the two situations, the receiver 530 is able to support multi-user CFO correction functionality for CDMA, as shown in a functional block 531, according to the invention. More specifically, the receiver 530 is able to perform multi-user CFO correction functionality for CDMA, as shown in a functional block 531, on the signal received from the satellite 553. The FIG. 5 shows just one of the many embodiments where the multi-user CFO correction functionality for CDMA, performed according to the invention, may be performed to provide for improved receiver and system performance.

Figure 6:
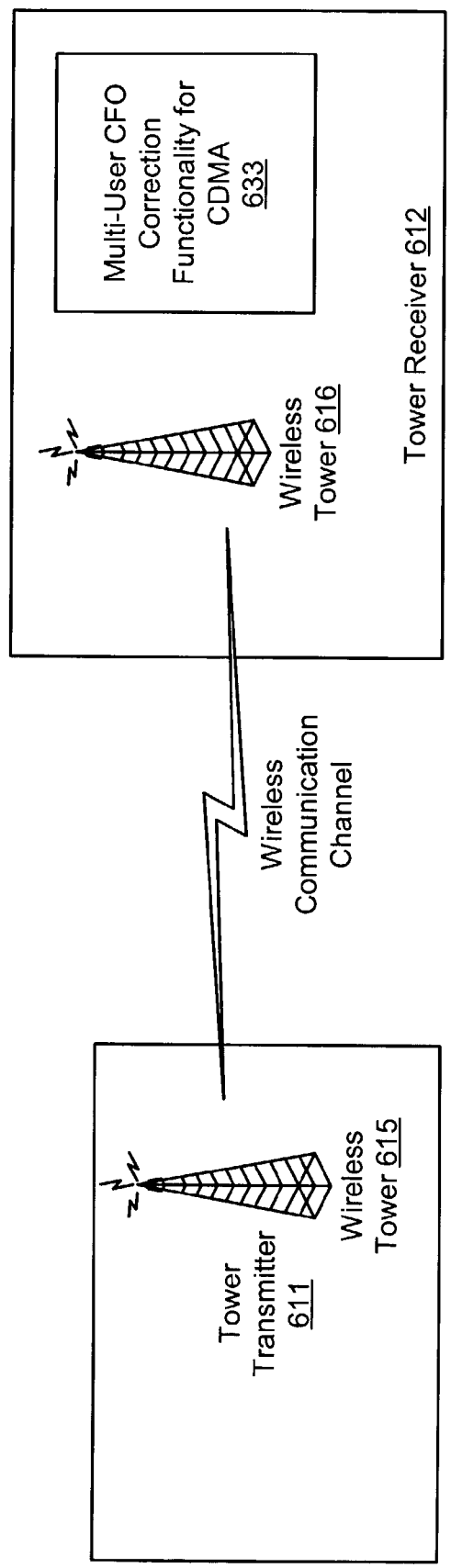
FIG. 6 is a system diagram illustrating an embodiment of a microwave communication system that is built according to the invention.

FIG. 6 is a system diagram illustrating an embodiment of a microwave communication system 600 that is built according to the invention. A tower transmitter 611 includes a wireless tower 615. The tower transmitter 611, using its wireless tower 615, transmits a signal to a tower receiver 612 via a wireless communication channel. The tower receiver 612 includes a wireless tower 616. The wireless tower 616 is able to receive transmissions from the wireless tower 615 that have been communicated via the wireless communication channel. The tower receiver 612 is then able to support multi-user CFO correction functionality for CDMA, as shown in a functional block 633. The FIG. 6 shows just one of many embodiments where multi-user CFO correction functionality for CDMA, performed according to the invention, may be performed to provide for improved receiver and system performance.

Figure 7:
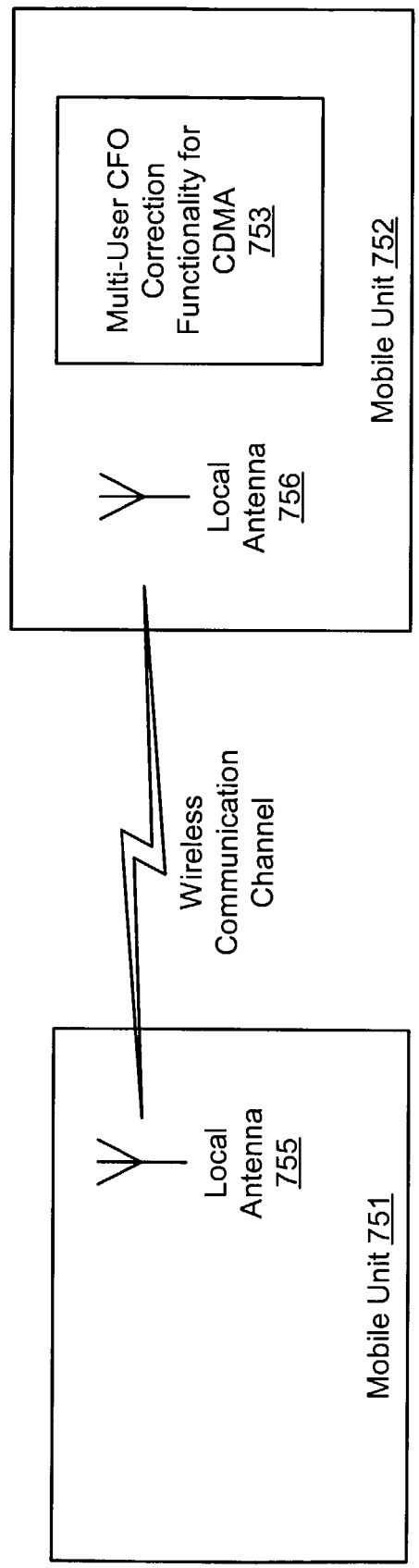
FIG. 7 is a system diagram illustrating an embodiment of a point-to-point radio communication system that is built according to the invention.

FIG. 7 is a system diagram illustrating an embodiment of a point-to-point radio communication system 700 that is built according to the invention. A mobile unit 751 includes a local antenna 755. The mobile unit 751, using its local antenna 755, transmits a signal to a local antenna 756 via a wireless communication channel. The local antenna 756 is included within a mobile unit 752. The mobile unit 752 is able to receive transmissions from the mobile unit 751 that have been communicated via the wireless communication channel. The mobile unit 752 is then able to support multi-user CFO correction functionality for CDMA, as shown in a functional block 753, on the received signal. The FIG. 7 shows just one of the many embodiments where multi-user CFO correction functionality for CDMA, performed according to the invention, may be performed to provide for improved receiver and system performance.

Figure 8:
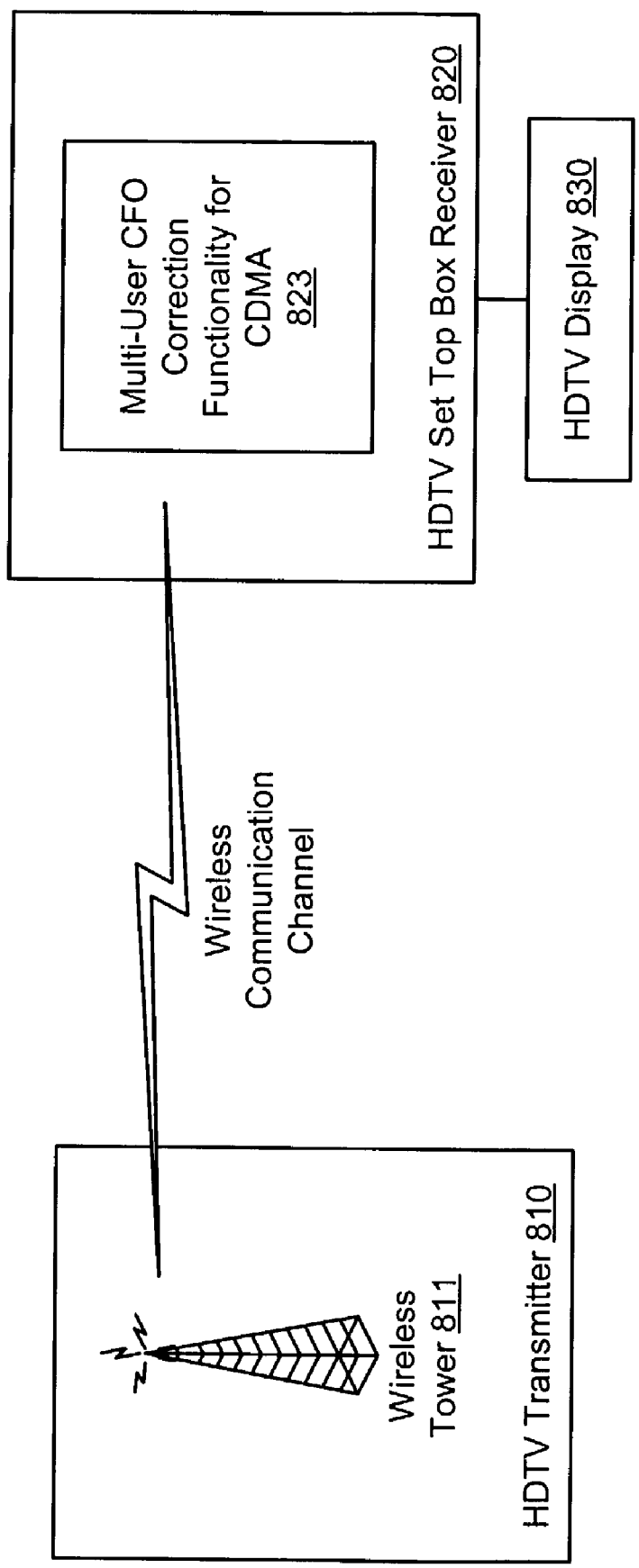
FIG. 8 is a system diagram illustrating an embodiment of a high definition television (HDTV) communication system that is built according to the invention.

FIG. 8 is a system diagram illustrating an embodiment of a high definition television (HDTV) communication system 800 that is built according to the invention. An HDTV transmitter 810 includes a wireless tower 811. The HDTV transmitter 810, using its wireless tower 811, transmits a signal to an HDTV set top box receiver 820 via a wireless communication channel. The HDTV set top box receiver 820 includes the functionality to receive the wireless transmitted signal. The HDTV set top box receiver 820 is also communicatively coupled to an HDTV display 830 that is able to display the demodulated and decoded wireless transmitted signals received by the HDTV set top box receiver 820.

The HDTV set top box receiver 820 is then able to support multi-user CFO correction functionality for CDMA, as shown in a functional block 823 to provide for improved receiver performance. The FIG. 8 shows yet another of the many embodiments where multi-user CFO correction functionality for CDMA, performed according to the invention, may be performed to provide for improved receiver and system performance.

Figure 9:
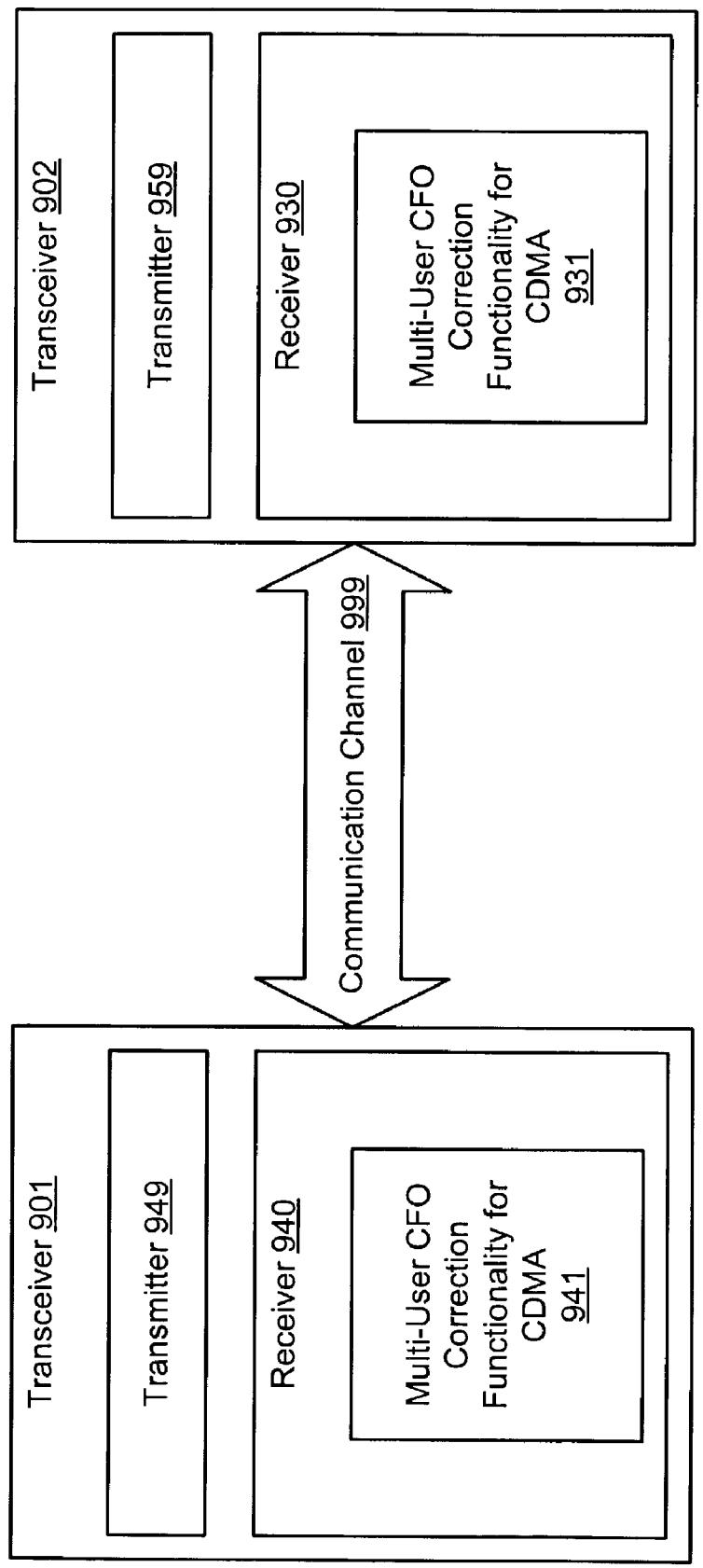
FIG. 9 is a system diagram illustrating an embodiment of a communication system that is built according to the invention.

FIG. 9 is a system diagram illustrating an embodiment of a communication system that is built according to the invention. The FIG. 9 shows communicative coupling, via a communication channel 999, between two transceivers, namely, between a transceiver 901 and a transceiver 902. The communication channel 999 may be a wireline communication channel or a wireless communication channel.

Each of the transceivers 901 and 902 includes a transmitter and a receiver. For example, the transceiver 901 includes a transmitter 949 and a receiver 940; the transceiver 902 includes a transmitter 959 and a receiver 930. The receivers 940 and 930, within the transceivers 901 and 902, respectively, are each operable to support multi-user CFO correction functionality for CDMA according to the invention. This will allow improved signal processing for both of the transceivers 901 and 902. For example, the receiver 940, within the transceiver 901, is able to support multi-user CFO correction functionality for CDMA, as shown in a functional block 941, on a signal received from the transmitter 959 of the transceiver 902. Similarly, the receiver 930, within the transceiver 902, is able to support multi-user CFO correction functionality for CDMA, as shown in a functional block 931, on a signal received from the transmitter 949 of the transceiver 901. The FIG. 9 shows yet another of many embodiments where multi-user CFO correction functionality for CDMA, performed according to the invention, may be performed to provide for improved receiver performance.

Figure 10:
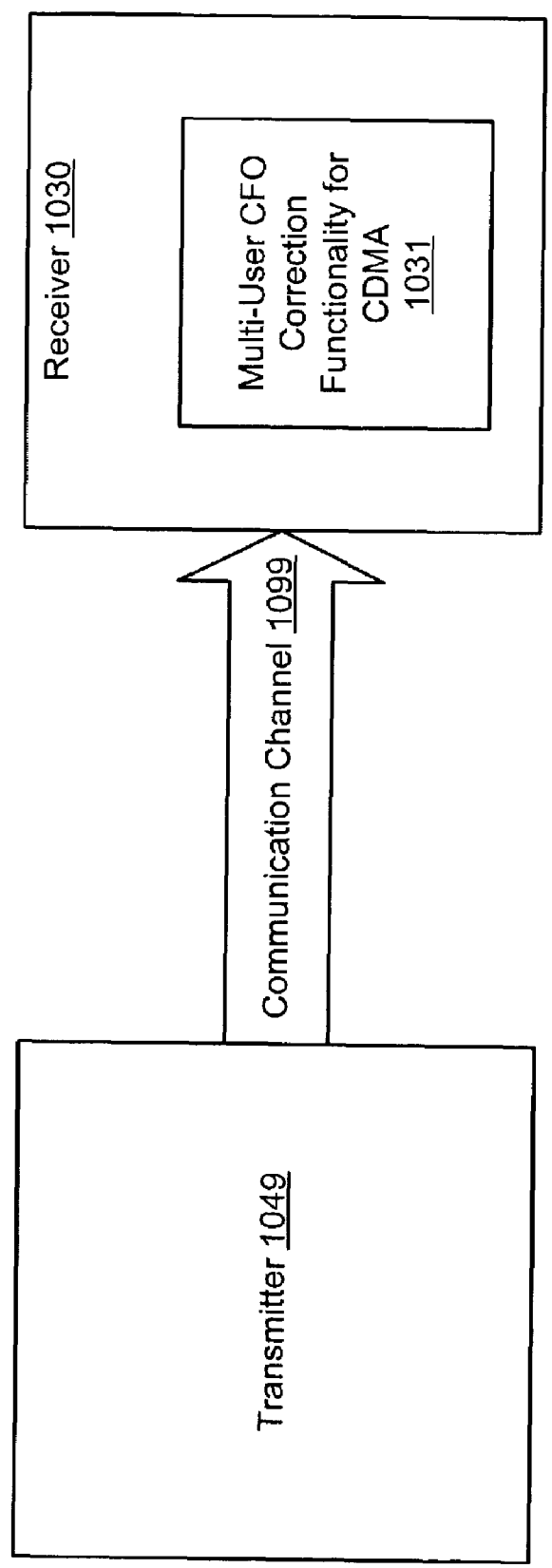
FIG. 10 is a system diagram illustrating another embodiment of a communication system that is built according to the invention.

FIG. 10 is a system diagram illustrating another embodiment of a communication system 1000 that is built according to the invention. The FIG. 10 shows communicative coupling, via a uni-directional communication channel 1099, between a transmitter 1049 and a receiver 1030. The communication channel 1099 may be a wireline communication channel or a wireless communication channel. The receiver 1030 is operable to support multi-user CFO correction functionality for CDMA, as shown in a functional block 1031, according to the invention. The FIG. 10 shows yet another of many embodiments where multi-user CFO correction functionality for CDMA, performed according to the invention, may be performed to provide for improved receiver and system performance.

Figure 11:
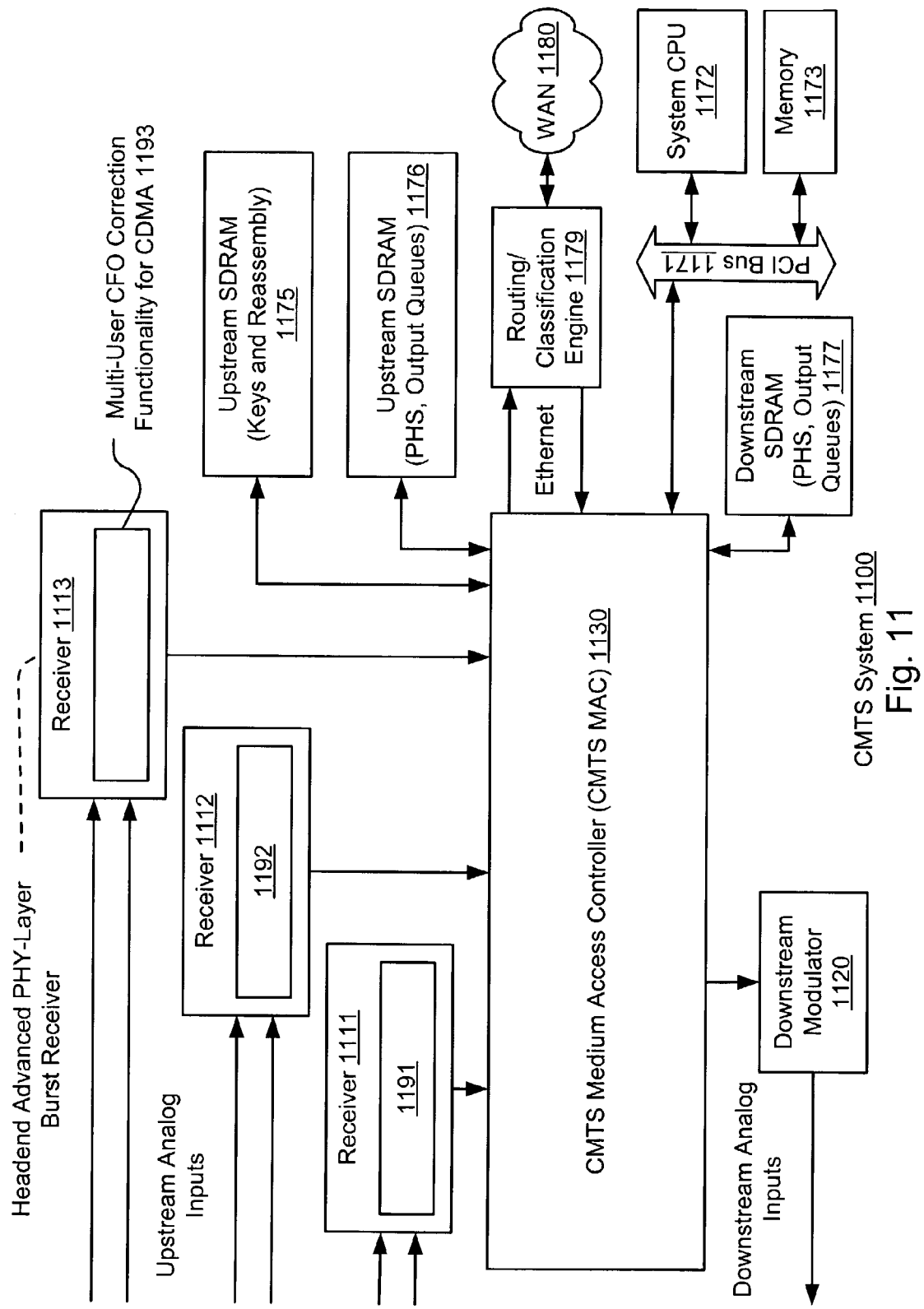
FIG. 11 is a system diagram illustrating an embodiment of a cable modem termination system (CMTS) system that is built according to the invention.
Figure 12:
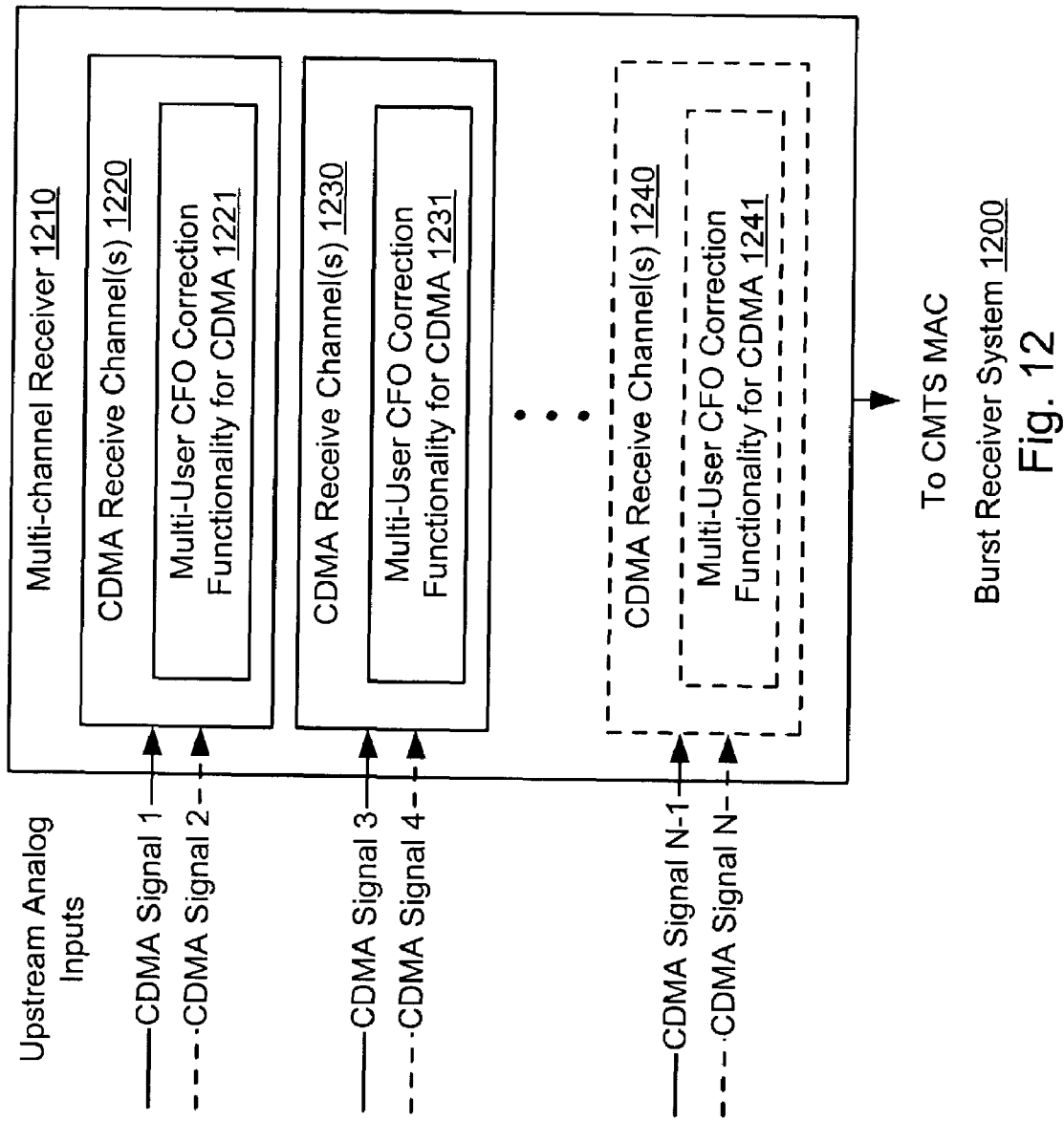
FIG. 12 is a system diagram illustrating an embodiment of a burst receiver system that is built according to the invention.

FIG. 11 is a system diagram illustrating an embodiment of a CMTS system 1100 that is built according to the invention. The CMTS system 1100 includes a CMTS medium access controller (MAC) 1130 that operates with a number of other devices to perform communication from one or more CMs to a WAN 1180. The CMTS MAC 1130 may be viewed as providing the hardware support for MAC-layer per-packet functions including fragmentation, concatenation, and payload header suppression that all are able to offload the processing required by a system central processing unit (CPU) 1172. This will provide for higher overall system performance. In addition, the CMTS MAC 1130 is able to provide support for carrier class redundancy via timestamp synchronization across a number of receivers, shown as a receiver 1111, a receiver 1111, and a receiver 1113 that are each operable to receive upstream analog inputs. In certain embodiments, each of the receivers 1111, 1112, and 1113 are dual universal advanced TDMA/CDMA (Time Division Multiple Access/Code Division Multiple Access) PHY-layer burst receivers. That is to say, each of the receivers 1111, 1112, and 1113 includes at least one TDMA receive channel and at least one CDMA receive channel; in this case, each of the receivers 1111, 1112, and 1113 may be viewed as being multi-channel receivers. In other embodiments, the receivers 1111, 1112, and 1113 includes only CDMA receive channels. One possible embodiment of an embodiment of a receiver including only CDMA receive channels is shown in FIG. 12.

In addition, the CMTS MAC 1130 may be operated remotely with a routing/classification engine 1179 that is located externally to the CMTS MAC 1130 for distributed CMTS applications including mini fiber node applications. Moreover, a Standard Programming Interface (SPI) master port may be employed to control the interface to the receivers 1111, 1112, and 1113 as well as to a downstream modulator 1120.

The CMTS MAC 1130 may be viewed as being a highly integrated CMTS MAC integrated circuit (IC) for use within the various DOCSIS and advanced TDMA/CDMA physical layer (PHY-layer) CMTS products. The CMTS MAC 1130 employs sophisticated hardware engines for upstream and downstream paths. The upstream processor design is segmented and uses two banks of Synchronous Dynamic Random Access Memory (SDRAM) to minimize latency on internal buses. The two banks of SDRAM used by the upstream processor are shown as upstream SDRAM 1175 (operable to support keys and reassembly) and SDRAM 1176 (operable to support Packaging, Handling, and Storage (PHS) and output queues). The upstream processor performs Data Encryption Standard (DES) decryption, fragment reassembly, de-concatenation, payload packet expansion, packet acceleration, upstream Management Information Base (MIB) statistic gathering, and priority queuing for the resultant packets. Each output queue can be independently configured to output packets to either a Personal Computer Interface (PCI) or a Gigabit Media Independent Interface (GMII). DOCSIS MAC management messages and bandwidth requests are extracted and queued separately from data packets so that they are readily available to the system controller.

The downstream processor accepts packets from priority queues and performs payload header suppression, DOCSIS header creation, DES encryption, Cyclic Redundancy Check (CRC) and Header Check Sequence (of the DOCSIS specification), Moving Pictures Experts Group (MPEG) encapsulation and multiplexing, and timestamp generation on the in-band data. The CMTS MAC 1130 includes an out-of-band generator and CDMA PHY-layer (and/or TDMA PHY-layer) interface so that it may communicate with a CM device's out-of-band receiver for control of power management functions. The downstream processor will also use SDRAM 1177 (operable to support PHS and output queues). The CMTS MAC 1130 may be configured and managed externally via a PCI interface and a PCI bus 1171.

Each of the receivers 1111, 1112, and 1113 is operable to support multi-user CFO correction functionality for CDMA. For example, the receiver 1111 is operable to support multi-user CFO correction functionality for CDMA, as shown in a functional block 1191; the receiver 1112 is operable to support multi-user CFO correction functionality for CDMA, as shown in a functional block 1192; and the receiver 1113 is operable to support multi-user CFO correction functionality for CDMA, as shown in a functional block 1193. The FIG. 11 shows yet another embodiment in which multi-user CFO correction functionality for CDMA may be performed according to the invention. Any of the functionality and operations described in the other embodiments may be performed within the context of the CMTS system 1100 without departing from the scope and spirit of the invention.

FIG. 12 is a system diagram illustrating an embodiment of a burst receiver system 1200 that is built according to the invention. The burst receiver system 1200 includes at least one multi-channel receiver 1210. The multi-channel receiver 1210 is operable to receive a number of upstream analog inputs that are transmitted from CMs. The upstream analog inputs may be in the form of either TDMA (Time Division Multiple Access) and/or CDMA (Code Division Multiple Access) format. A number of receive channels may be included within the multi-channel receiver 1210. The FIG. 12 shows a particular embodiment where the multi-channel receiver 1210 includes a number of CDMA receive channels; however, TDMA receive channels may also be included.

For example, the multi-channel receiver 1210 is operable to support CDMA receive channels 1220 (shown as CDMA signal 1 and CDMA signal 2) and to support multi-user CFO correction functionality for CDMA, as shown in a functional block 1221, for those received CDMA signals. In addition, the multi-channel receiver 1210 is operable to support CDMA receive channels 1230 (shown as CDMA signal 3 and CDMA signal 4) and to support multi-user CFO correction functionality for CDMA, as shown in a functional block 1231, for those received CDMA signals; the multi-channel receiver 1210 is operable to support CDMA receive channels 1240 (shown as CDMA signal N and CDMA signal N-1) and to support multi-user CFO correction functionality for CDMA, as shown in a functional block 1241, for those received CDMA signals.

Generically speaking, the multi-channel receiver 1210 is operable to support a number of receive channels and to support multi-user CFO correction functionality for CDMA for those received signals. The multi-channel receiver 1210 of the FIG. 12 is operable to interface with a CMTS MAC. The burst receiver system 1200 may include a number of multi-channel receivers that are each operable to interface with the CMTS MAC.

In certain embodiments, the multi-channel receiver 1210 provides a number of various functionalities. The multi-channel receiver 1210 may be a universal headend advanced TDMA PHY-layer QPSK/QAM (Quadrature Phase Shift Keying/Quadrature Amplitude Modulation) burst receiver; the multi-channel receiver 1210 also include functionality to be a universal headend advanced CDMA PHY-layer QPSK/QAM burst receiver; or the multi-channel receiver 1210 also include functionality to be a universal headend advanced TDMA/CDMA PHY-layer QPSK/QAM burst receiver offering both TDMA/CDMA functionality. The multi-channel receiver 1210 may be DOCSIS/EuroDOCSIS based, IEEE 802.14 compliant. The multi-channel receiver 1210 may be adaptable to numerous programmable demodulation including BPSK (Binary Phase Shift Keying), and/or QPSK, 8/16/32/64/128/256/516/1024 QAM (generally n-QAM). The multi-channel receiver 1210 is adaptable to support variable symbols rates as well. Other functionality may likewise be included to the multi-channel receiver 1210 without departing from the scope and spirit of the invention. Such variations and modifications may be made to the communication receiver.

While a particular embodiment of a burst receiver system 1200 is illustrated within the FIG. 12, it is also noted that a continuous receiver will also support multi-user CFO correction functionality for CDMA according to the invention. In general, any CDMA receiver may be adapted to support the multi-user CFO correction functionality for CDMA according to the invention.

For each of the various approaches to performing multi-user CFO correction for CDMA, a CDMA system of N codes is considered. Without loss of generality, we may assume the number of chips per symbol is equal to N and that the CFOs corresponding to each of the N codes are shown as follows:

$$\omega_1, \omega_2, \ldots, \omega_N$$

The received sequence r(n) of the $k^{th}$ spreading interval is then shown as follows:

$$r(n) = \sum_{i=1}^{N} d_{i,k} c_i(n) e^{j(\omega_i n + N\omega_i(k-1))}$$

where $d_{i,k}$ may be viewed as the data that has been sent, and $c_i(n)$ is the particular code for this a given sequence.

In matrix form, we can write the despread soft symbol decisions as a function of the data vector $d_{i,k}$.

$$\begin{bmatrix} s_{1,k} \\ s_{2,k} \\ \vdots \\ s_{N,k} \end{bmatrix} = \begin{bmatrix} a_{1,1} a_{1,2} \cdots a_{1,N} \\ a_{2,1} a_{2,2} \cdots a_{2,N} \\ \vdots \\ a_{N,1} a_{N,2} \cdots a_{N,N} \end{bmatrix} \cdot \begin{bmatrix} d_{1,k} \\ d_{2,k} \\ \vdots \\ d_{N,k} \end{bmatrix}$$

$$a_{i,j} = \sum_{n=1}^{N} c_i(n) c_j(n) e^{j(\omega_j n + N\omega_j(k-1))}$$

$$s_{i,k} = \sum_{n=1}^{N} r(n) c_i(n)$$

where the soft symbol decisions are shown as $s_{i,k}$, and the CFO matrix is shown as the matrix of the elements $a_{i,j}$. In a perfect system with no CFO at all (no ICI at all between the various codes), the off diagonal elements of the CFO matrix would be zero, when i≠j.

The first step of correcting for the frequency offsets is to estimate the CFOs $\omega_1, \omega_2, \ldots, \omega_N$. This may be performed in a number of ways without departing from the scope and spirit of the invention. Any of the ways to estimate the CFOs may be performed according to the invention. One such way is shown below in the description corresponding to the FIG. 13.

Figure 13:
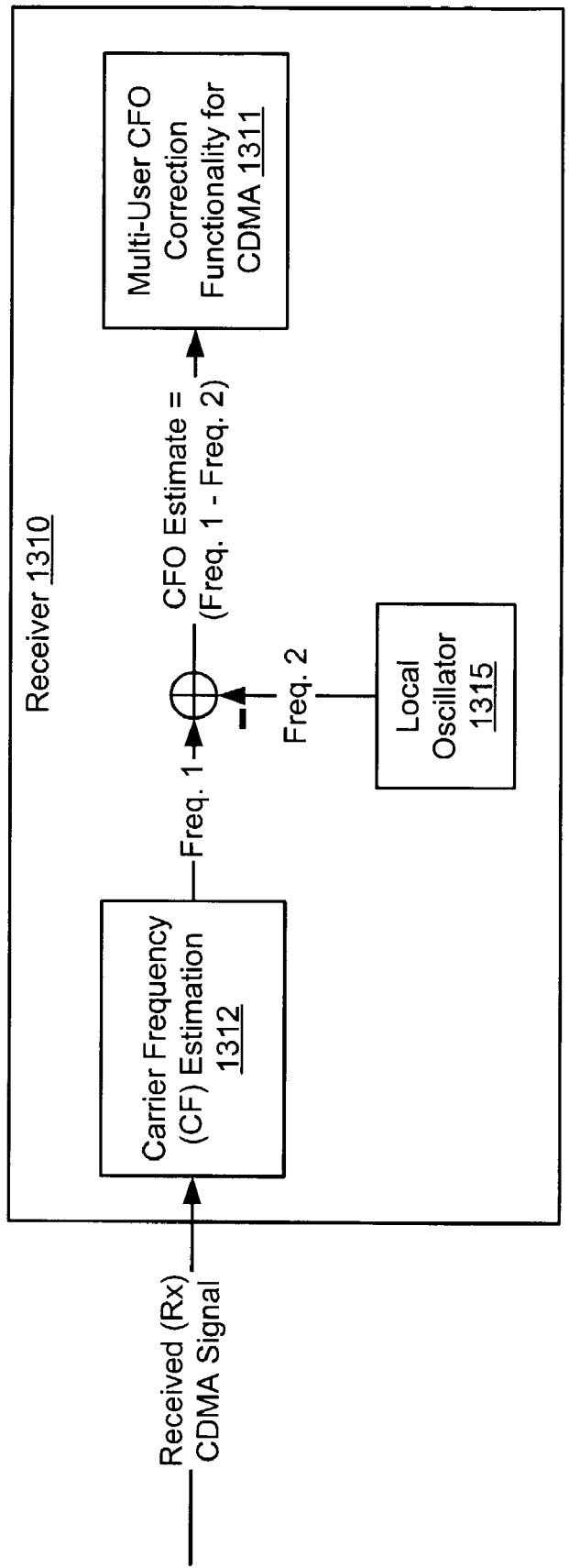
FIG. 13 is a functional block diagram illustrating an embodiment of CFO estimation that may be performed according to the invention.

FIG. 13 is a functional block diagram illustrating an embodiment of CFO estimation 1300 that may be performed according to the invention. A received CDMA signal (received Rx CDMA signal) is received by a receiver 1310. A carrier frequency (CF) estimation functional block 1312 estimates the CFs of the codes of the received CDMA signal. We look at one CFO in this embodiment; however, a number of codes (generating a number CFs will be employed in certain embodiments). Here, we calculate the CF of one of the codes, shown as frequency 1. A frequency 2 is provided from a local oscillator 1315; this frequency 2 is the local frequency employed within the receiver 1310. A CFO occurs when the received signal includes a CF that is different than the frequency generated by the local oscillator 1315. The difference between the frequency 1 and the frequency 2 is determined, shown as the CFO estimate. The receiver 1310 is operable to support multi-user CFO correction functionality for CDMA, as shown in a functional block 1311. The functional block 1311 substantially corrects for the offset within the CFO estimate to provide for improved communication receiver performance.

Now that the estimates of the CFOs are in hand, the invention is operable to continue within any of the following approaches described in the following Figures to perform correction of the CFO.

Figure 14:
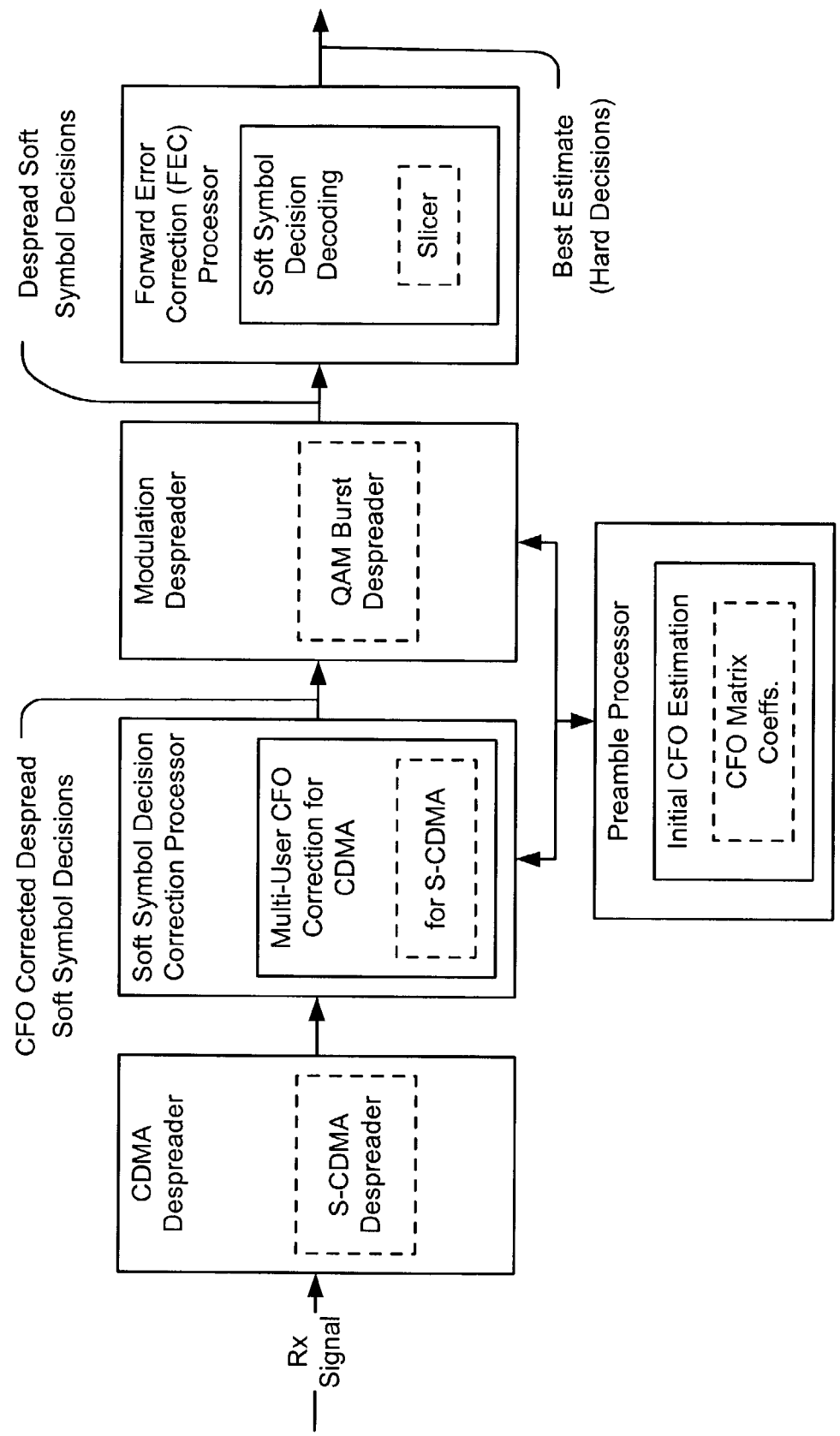
FIG. 14 is a functional block diagram illustrating an embodiment of a communication receiver that is arranged according to the invention.

FIG. 14 is a functional block diagram illustrating an embodiment of a communication receiver 1400 that is arranged according to the invention. A received signal (Rx signal) is provided to a CDMA despreader. The CDMA despreader may be operable to support dispreading for a S-CDMA signal as well. Within the CDMA despreader, the individual codes are recovered from the received signal.

The received signal will typically include a preamble sequence. The despread preamble is provided to a preamble processor. The preamble processor is operable to perform initial CFO estimation of the received signal. In doing so, the preamble processor will generate the CFO matrix CFOs; as shown above, the CFO matrix is shown as the matrix having the elements $a_{i,j}$.

The output from the CDMA despreader is provided to a soft symbol correction processor. In addition, the CFO estimates (including a sub-set or all of the CFO matrix coefficients in various embodiments) are also provided to the soft symbol correction processor. The soft symbol correction processor is also operable to support multi-user CFO correction functionality for CDMA. In this embodiment, as within the other embodiments, it is noted that the correction for CDMA may also be performed for S-CDMA as well.

Afterwards, a modulation despreader properly despreads the CFO corrected despread soft symbol decisions according to their respective modulation. The modulation includes a constellation and a mapping. For example, the modulation despreader may be a QAM burst despreader that properly despreads the received symbols, when in a QAM modulation format, to the appropriate n-QAM modulation (according to the proper constellation and mapping). The output from the modulation despreader includes the despread soft symbol decisions.

It is noted that the symbols may include as few as one bit per symbol and up to many bits per symbol. These despread soft symbol decisions have been properly despread (with respect to the CDMA coding) and have also been despread (with respect to the modulation by which the data has been coded).

The FIG. 14 shows yet another embodiment where multi-user CFO correction for CDMA may be performed according to the invention.

Figure 15:
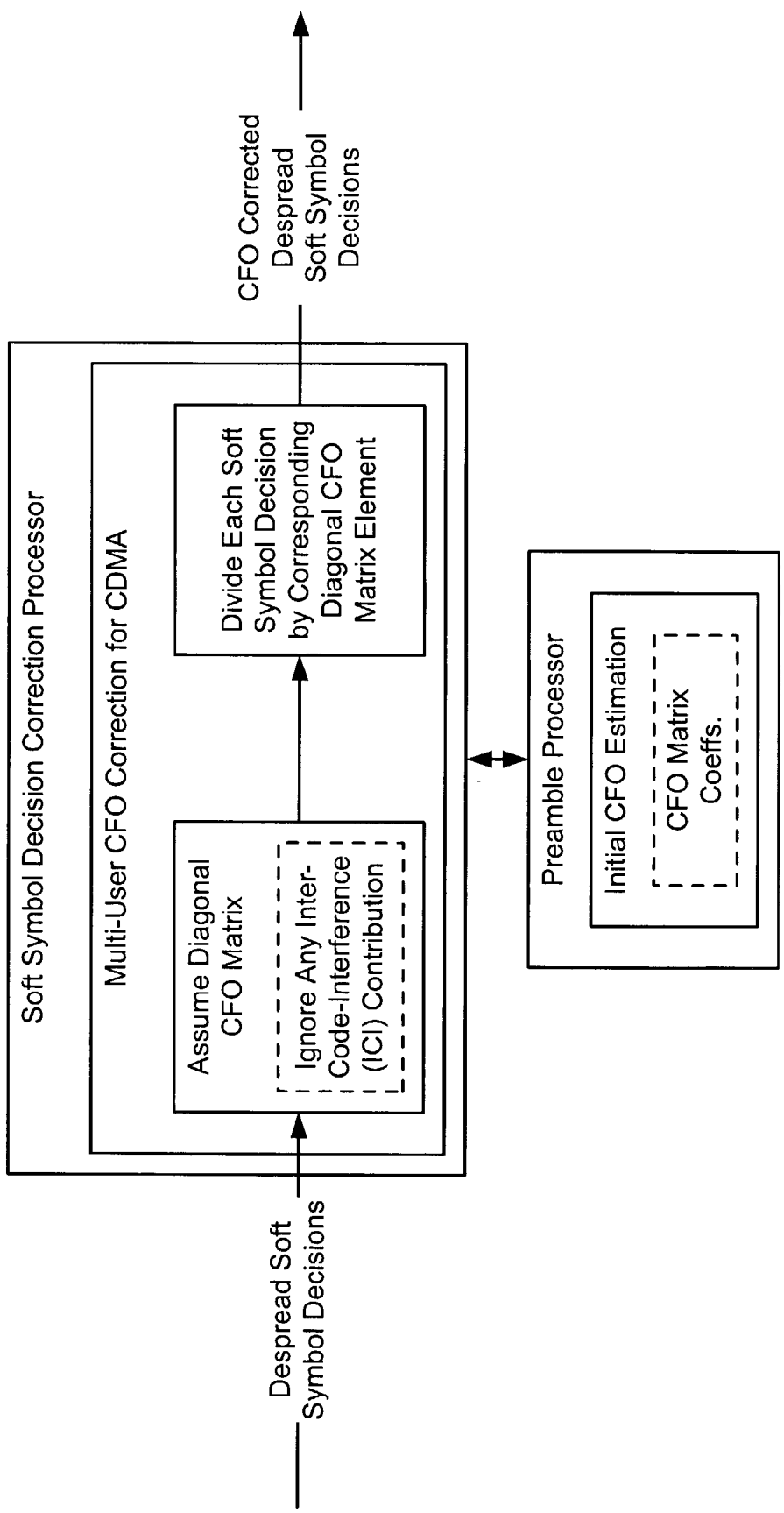
FIG. 15 is a functional block diagram illustrating an embodiment of soft symbol decision correction processing that is performed according to the invention.

FIG. 15 is a functional block diagram illustrating an embodiment of soft symbol decision correction processing 1500 that is performed according to the invention. The despread soft symbol decisions are provided to a soft symbol decision correction processor in the FIG. 15. The soft symbol decision correction processor of the FIG. 15 may be viewed as just one of the many possible embodiments of the soft symbol decision correction processor of the FIG. 14. This soft symbol decision correction processor of the FIG. 15 is also operable to support multi-user CFO correction functionality for CDMA.

A despread preamble of a received signal is provided to a preamble processor. The preamble processor is operable to perform initial CFO estimation of the received signal. In doing so, the preamble processor will generate the CFO matrix CFOs; as shown above, the CFO matrix is the matrix having the elements $a_{i,j}$.

In performing multi-user CFO correction functionality for CDMA according to the embodiment of the FIG. 15, the soft symbol decision correction processor assumes a diagonal CFO matrix. This will include ignoring any contribution of ICI within the signal. The off diagonal elements within the CFO matrix are set to values of zero. For example, the following assumption is made within the soft symbol decision correction processor:

$$a_{i,j}=0, \text{ for } i \neq j$$

In other words, this assumption will result in an entirely diagonal CFO matrix. Then, the despread soft symbol decisions may be independently corrected. In this case, the soft symbol decisions for different codes are de-coupled and each soft symbol decision could be corrected independently and then used to obtain a corresponding hard-decision as $$\hat{d}_{i,k} = \text{slice}(s_{i,k}/a_{i,j})$$

$$a_{i,i} = \sum_{n=1}^{N} e^{j(\omega_i n + N\omega_i(k-1))} \approx e^{j(N\omega_j(k-1/2))}.$$

Each soft symbol decision is divided by the corresponding diagonal CFO matrix element corresponding to that soft symbol decision. The soft symbol decision correction processor then outputs CFO corrected despread soft symbol decisions. The hard-decision estimating of these soft symbol decisions may be made within the FEC correction processor as shown in the FIG. 14.

The approach of the functionality described here in the FIG. 15 has the advantage of very low complexity. While it may not correct totally for all ICI within the system, it does provide a solution that is relatively easy to implement; and it is very computationally efficient. As the CFOs increase, the ICI will significantly increase as well. If desired, this approach may selectively be performed only within systems that include relatively small CFOs, and therefore relatively little ICI. Again, it is noted that the functionality of the FIG. 15 ignores the ICI contribution of one code to the others. To generate the inverse of the matrix, the inverse of the individual elements of the matrix may be directly calculated.

Figure 16:
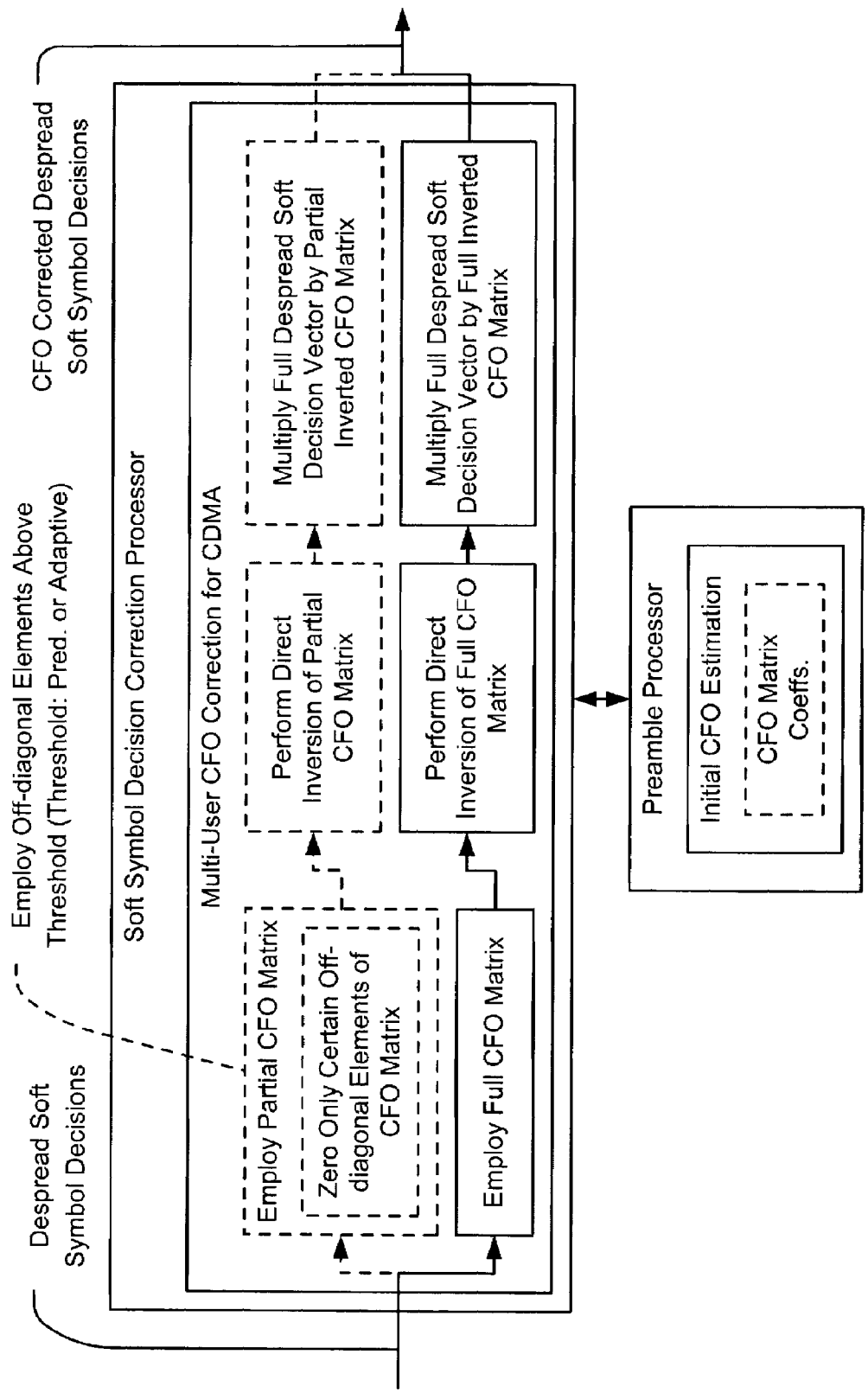
FIG. 16 is a functional block diagram illustrating another embodiment of soft symbol decision correction processing that is performed according to the invention.

FIG. 16 is a functional block diagram illustrating another embodiment of soft symbol decision correction processing 1600 that is performed according to the invention. The despread soft symbol decisions are provided to a soft symbol decision correction processor in the FIG. 16. The soft symbol decision correction processor of the FIG. 16 may be viewed as just one of the many possible embodiments of the soft symbol decision correction processor of the FIG. 14. This soft symbol decision correction processor of the FIG. 16 is also operable to support multi-user CFO correction functionality for CDMA.

Again, a despread preamble of a received signal is provided to a preamble processor. The preamble processor is operable to perform initial CFO estimation of the received signal. In doing so, the preamble processor will generate the CFO matrix CFOs; as shown above, the CFO matrix is the matrix having the elements $a_{i,j}$.

Here, using the functionality of the FIG. 16, we employ the information of our precise knowledge of the entire CFO matrix. In using this information explicitly, a much cleaner output vector of the CFO corrected despread soft symbol decisions may be generated. Within this embodiment, a least squares (LS) approach is employed, but any number of error minimization techniques may be used without departing from the scope and spirit of the invention. Any method of solving a linear set of equations may be employed that relates the hard decisions $\hat{d}$ to the soft symbol decisions s.

In this embodiment, the soft symbol decision correction processor employs the full CFO matrix. Then, the soft symbol decision correction processor performs the direct inversion of the full CFO matrix. After this inverted CFO matrix is calculated, the full despread soft symbol decision vector is multiplied by it to generate the CFO corrected despread soft symbol decisions.

$$\begin{bmatrix} \hat{d}_{1,k} \\ \hat{d}_{2,k} \\ \vdots \\ \hat{d}_{N,k} \end{bmatrix} = \text{slice} \left( \begin{bmatrix} a_{1,1} a_{1,2} \cdots a_{1,N} \\ a_{2,1} a_{2,2} \cdots a_{2,N} \\ \vdots \\ a_{N,1} a_{N,2} \cdots a_{N,N} \end{bmatrix}^{-1} \cdot \begin{bmatrix} s_{1,k} \\ s_{2,k} \\ \vdots \\ s_{N,k} \end{bmatrix} \right)$$

$$a_{i,j} = \sum_{n=1}^{N} c_i(n) c_j(n) e^{j(\omega_i n + N\omega_j(k-1))}$$

The CFO corrected despread soft symbol decisions are then output from the soft symbol decision correction processor. They may then sliced to obtain the corresponding hard-decisions using the FEC correction processor as shown in the FIG. 14.

This least-squares technique perfectly corrects for the CFOs in one step. However, it requires a full matrix inversion operation, which may be too computationally complex for certain applications. However, for other embodiments having sufficient processing resources, it may be operable and will provide an optimal solution.

In an alternative variation of the embodiment shown within the FIG. 16, a sub-set of the CFO matrix may be employed in stead of using all of the elements of the CFO matrix. For example, an embodiment described above includes only the diagonal elements of CFO matrix. However, the invention may be implemented such that the magnitude of the off-diagonal elements within the CFO matrix may be compared to a threshold. Only those off-diagonal elements exceeding the threshold will then be used within the CFO matrix when performing multi-user CFO correction for CDMA. In some situations, the resulting matrix will be a much more sparse matrix than the full CFO matrix, yet it will potentially have more elements than the CFO matrix employed within the totally diagonal CFO matrix implementation.

An example of the mathematical operations that would be performed is shown below:

$$\begin{bmatrix} \hat{d}_{1,k} \\ \hat{d}_{2,k} \\ \hat{d}_{3,k} \\ \vdots \\ \hat{d}_{N,k} \end{bmatrix} = \text{slice} \left( \begin{bmatrix} a_{1,1} a_{1,2} 0 a_{1,4} \cdots 0 \\ a_{2,1} a_{2,2} a_{2,3} a_{2,4} \cdots a_{2,N} \\ 0 a_{3,2} a_{3,3} 0 \cdots a_{2,N} \\ \vdots \\ 0 a_{N,2} a_{N,3} a_{N,4} \cdots a_{N,N} \end{bmatrix}^{-1} \cdot \begin{bmatrix} s_{1,k} \\ s_{2,k} \\ s_{3,k} \\ \vdots \\ s_{N,k} \end{bmatrix} \right)$$

$$a_{i,j} = \sum_{n=1}^{N} c_i(n) c_j(n) e^{j(\omega_i n + N\omega_j(k-1))}$$

Here, we can see that some of the elements of the CFO matrix are in fact zeroed. In this example embodiment, these CFO element values will have been found to be less than the threshold employed. This threshold may be predetermined and defined beforehand, or it may be arrived at adaptively based on the operating conditions and/or system resources available within the device that performs multi-user CFO correction functionality for CDMA.

So, in this alternative embodiment, the soft symbol decision correction processor employs a partial CFO matrix. This partial CFO matrix will probably include zero values for only some of the off-diagonal elements of the CFO matrix. Then, the soft symbol decision correction processor performs matrix inversion of the partial CFO matrix. After this inverted partial CFO matrix is calculated, the full despread soft symbol decision vector is multiplied by it to generate the CFO corrected despread soft symbol decisions. While this alternative embodiment is not as accurate as the full CFO matrix inversion approach, it will still provide for greater accuracy than with the purely diagonal element CFO matrix. This alternative embodiment offers an intermediate solution that may be employed to offer greater accuracy and yet will probably be less consumptive and demanding of processing resources of the device that performs multi-user CFO correction functionality for CDMA.

Figure 17:
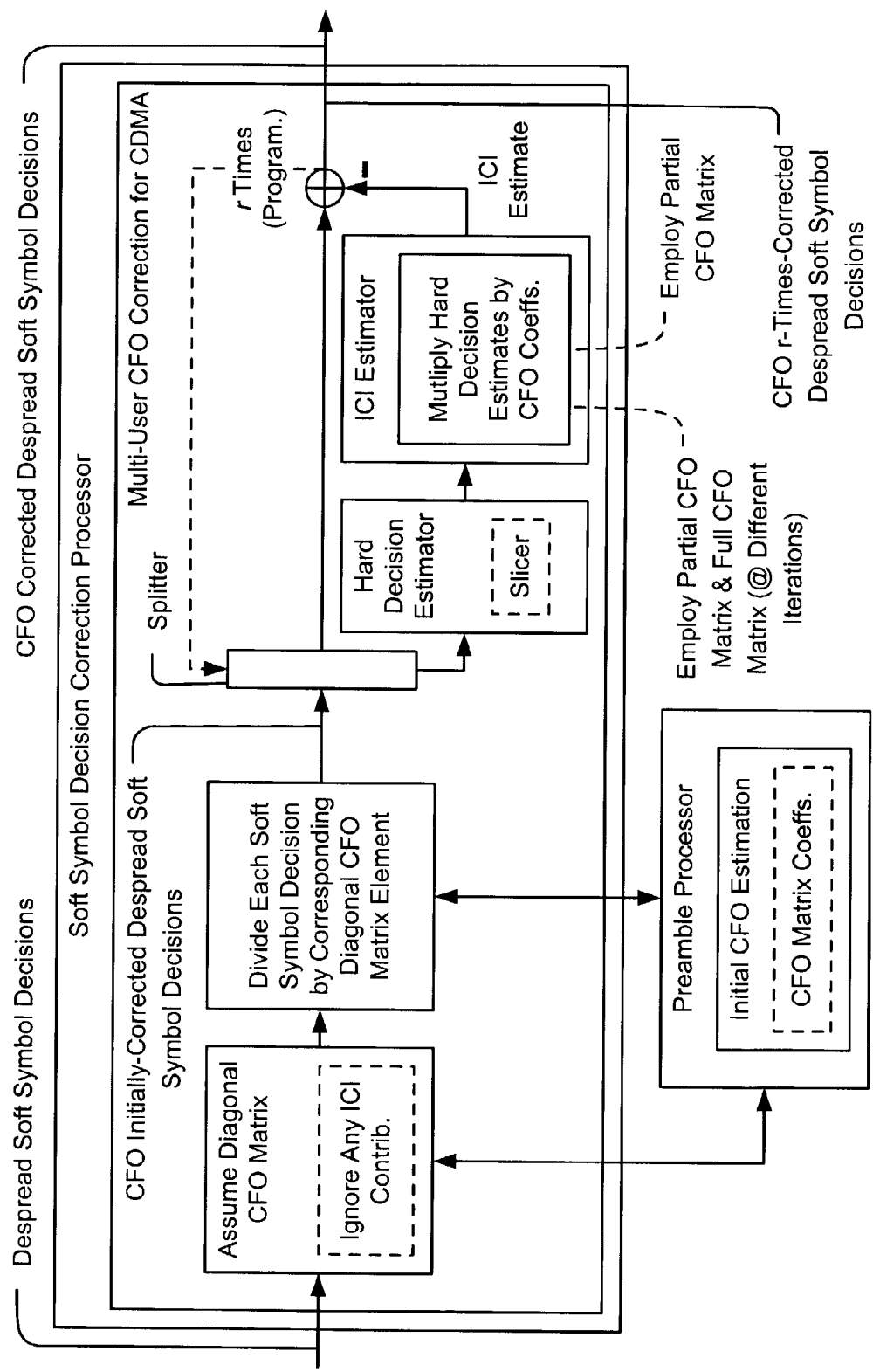
FIG. 17 is a functional block diagram illustrating another embodiment of soft symbol decision correction processing that is performed according to the invention.

FIG. 17 is a functional block diagram illustrating another embodiment of soft symbol decision correction processing that is performed according to the invention. The despread soft symbol decisions are provided to a soft symbol decision correction processor in the FIG. 17. The soft symbol decision correction processor of the FIG. 17 may be viewed as just one of the many possible embodiments of the soft symbol decision correction processor of the FIG. 14. This soft symbol decision correction processor of the FIG. 17 is also operable to support multi-user CFO correction functionality for CDMA.

Again, a despread preamble of a received signal is provided to a preamble processor. The preamble processor is operable to perform initial CFO estimation of the received signal. In doing so, the preamble processor will generate the CFO matrix CFOs; as shown above, the CFO matrix is the matrix having the elements $a_{i,j}$. The full direct CFO matrix inversion operation performed above within the embodiment of the FIG. 16 is avoided within the embodiment of the FIG. 17.

Initially, single-user correction is first performed on the despread soft symbol decisions. In other words, this assumption will result in an entirely diagonal CFO matrix. Then, the despread soft symbol decisions may be independently corrected.

$$s_{i,k}(\text{initially corrected}) = s_{i,k}/a_{i,i}$$

$$a_{i,i} = \sum_{n=1}^{N} e^{j(\omega_i n + N\omega_i(k-1))} \approx e^{j(N\omega_j(k-1/2))}.$$

In this case, the soft symbol decisions for different codes are de-coupled and each soft symbol decision may be corrected independently. These now-partially CFO corrected soft symbol decisions are then provided to a splitter. One output path of the splitter includes a hard decision estimator (that may employ a slicer) to generate corresponding hard-decisions for these CFO corrected soft symbol decisions. These CFO corrected soft symbol decisions are passed to this hard decision estimator where best estimates of this version of the CFO corrected soft symbol decisions are made.

$$\hat{d}_{i,k} = \text{slice}(s_{i,k}(\text{initially corrected})).$$

These initial hard-decisions are multiplied by the CFO coefficients to obtain an estimate for the undesired ICI (within an ICI estimator). It is also noted that this embodiment of the invention may also be performed using the partial CFO matrix described above within other embodiments. There may be instances where the device that that performs multi-user CFO correction functionality for CDMA will not possess sufficient processing resources to employ all of the elements of the CFO matrix, and this will allow an implementation that employs less than all of the elements of the CFO matrix. Again, the determination of a threshold that may be used to determine which CFO elements to employ and which to zero may be predetermined or adaptively identified. Moreover, when performing this recursive/iterative approach of multi-user CFO correction for CDMA, there may be some iterations that employ the partial CFO matrix and other iterations that employ the full CFO matrix. For example, the partial CFO matrix may be employed to perform macro-correction while the full CFO matrix may be employed to perform micro-correction. The decision of which CFO matrix to use, either the full CFO matrix or the partial CFO matrix, may be based on a predetermined approach or may be adaptively determined during the iterative correction operation.

The initially corrected CFO corrected soft symbol decisions are also passed to the other output path of the splitter. The output of the ICI estimator and the output path of the splitter that simply provides the initially corrected CFO corrected soft symbol decisions meet again at a summing node. At this summing node, the ICI estimate of the initially corrected CFO corrected soft symbol decisions is then subtracted from the initially corrected despread soft symbol decisions to obtain cleaner soft symbol decisions. This may be viewed as obtaining next-order soft symbol decisions that have been corrected to even a greater degree from the deleterious effects of CFO. This will lead then also to even better hard estimates after performing any hard estimating that may be obtained using the FEC correction processor as shown in the FIG. 14.

The second set of soft symbol decisions (and hard decisions) may be achieved as shown below:

$$s_{i,k}(r+1) = s_{i,k}(r) - \sum_{j=1}^{N} a_{i,j}\hat{d}_{j,k}(r)$$

$$\hat{d}_{i,k}(r) = \text{slice}(s_{i,k}(r))$$

where r is the iteration index.

It is noted that this procedure may be repeated iteratively (r=1,2, . . . ) to enhance the accuracy of the obtained decisions in each step. The total number of iterations may be programmable; a predetermined number of iterations may be performed; the iterative operation may be terminated when convergence of a solution is reached; or some other criteria may be used to determine when to cease performing additional iterations. The procedure may also be restricted to correct for dominant CFOs only to further reduce complexity. It is noted here that the embodiment of the FIG. 16 generally has a better performance than the iterative technique shown here in the FIG. 17. However, the embodiment of the FIG. 17 is much less complex as it avoids the matrix inversion operation altogether. Using this technique within the FIG. 17, in conjunction with the technique described in the FIG. 15, the invention is operable to provide for significant ICI correction in the presence of CFOs, has a much higher accuracy than single-user CFOs approaches, and is significantly less complex in implementation.

Figure 18:
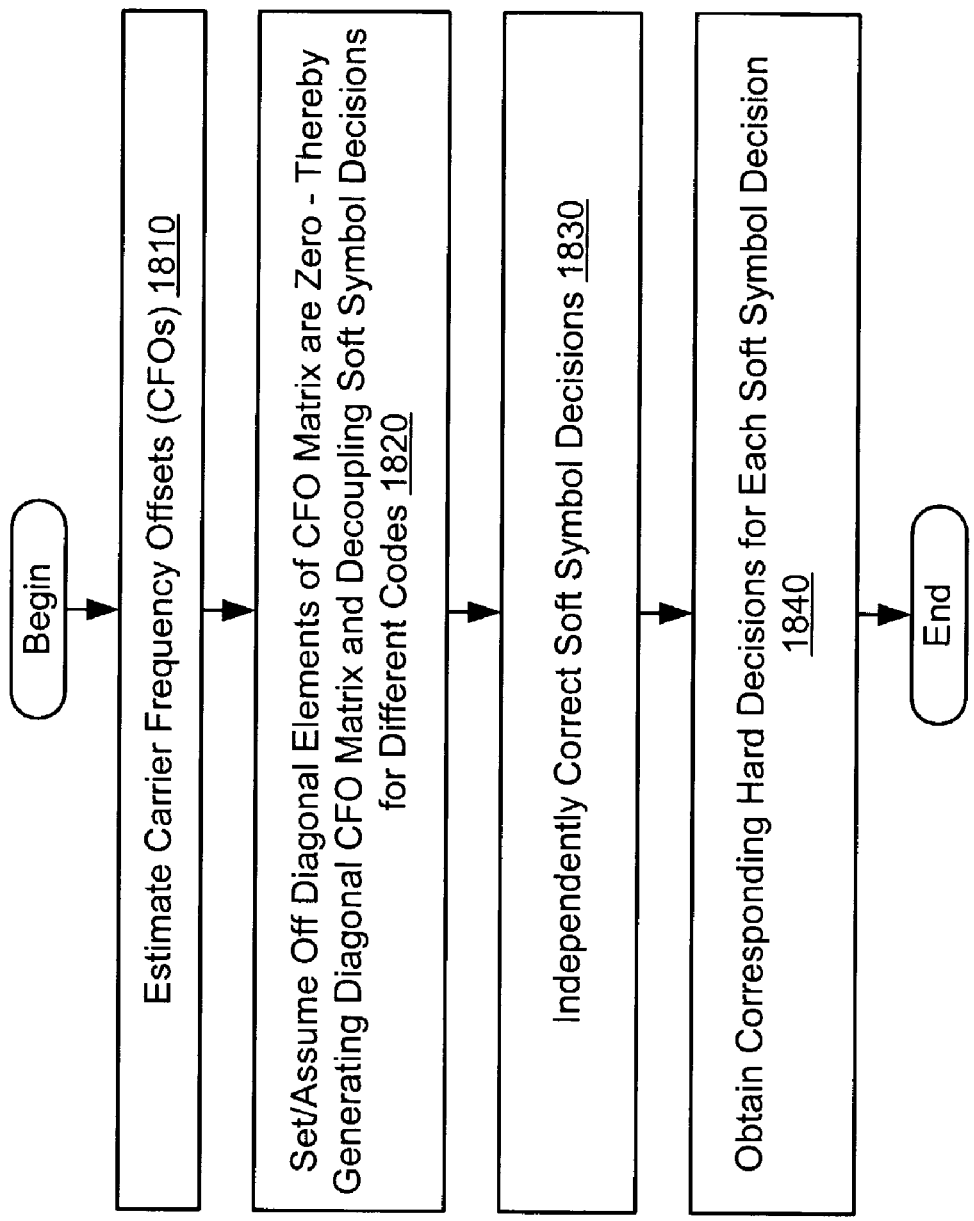
FIG. 18 is an operational flow diagram illustrating an embodiment of a multi-user CFO correction method for CDMA for single user that is performed according to the invention.

FIG. 18 is an operational flow diagram illustrating an embodiment of a multi-user CFO correction method for CDMA for single user 1800 that is performed according to the invention. As shown in a block 1810, the CFOs are estimated. Then, in a block 1820, it is assumed that there is no contribution of ICI within the signal and the off diagonal elements within the CFO matrix are set to values of zero. That is to say, this approach is performed as if it performs single user correction. The following assumption is made:

$$a_{i,j}=0, \text{ for } i \neq j$$

In other words, this assumption will result in an entirely diagonal CFO matrix. Then, the despread soft symbol decisions may be independently corrected as shown in a block 1830. In this case, the soft symbol decisions for different codes are de-coupled and each soft symbol decision could be corrected independently and then used to obtain a corresponding hard-decision as $$\hat{d}_{i,k}=\text{slice}(s_{i,k}/a_{i,i})$$

$$a_{i,i} = \sum_{n=1}^{N} e^{j(\omega_i n + N\omega_i(k-1))} \approx e^{j(N\omega_j(k-1/2))}$$

as shown in a block 1840. The approach of the FIG. 18 has the advantage of very low complexity. While it may not correct totally for all ICI within the system (the ICI can degrade the system performance significantly), it does provide a solution that is relatively easy to implement; it is very computationally efficient. As the CFOs increase, the ICI will significantly increase as well. If desired, this approach may selectively be performed only within systems that include relatively small CFOs, and therefore relatively little ICI. Again, it is noted that the approach of the FIG. 18 ignores the ICI contribution of one code to the others. To generate the inverse of the matrix, the inverse of the individual elements of the matrix may be directly calculated.

Figure 19:
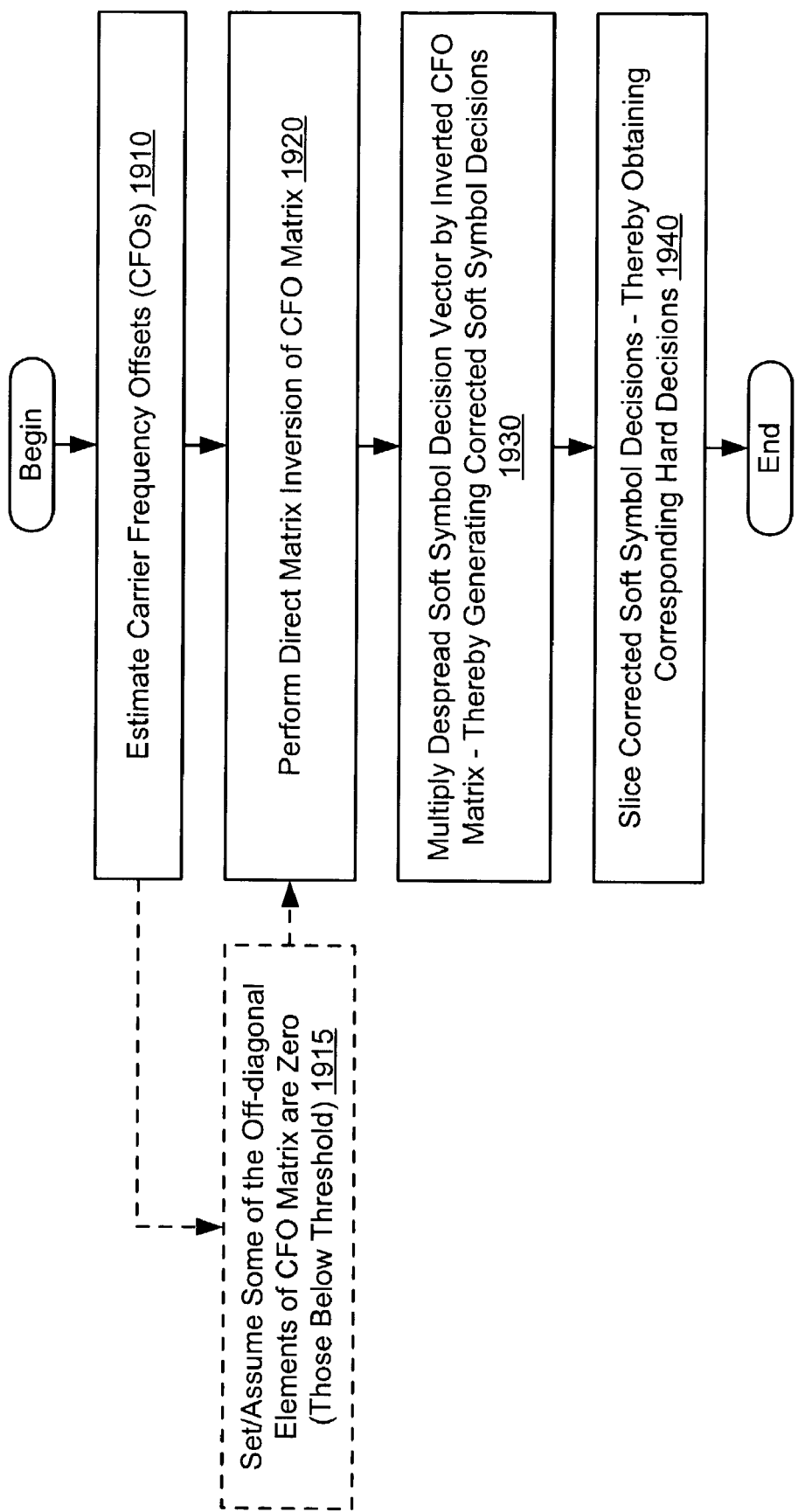
FIG. 19 is an operational flow diagram illustrating an embodiment of a multi-user CFO correction method for CDMA using direct matrix conversion that is performed according to the invention.

FIG. 19 is an operational flow diagram illustrating an embodiment of a multi-user CFO correction method for CDMA using direct matrix conversion that is performed according to the invention. The approach of the FIG. 19 may be viewed from the perspective of when the individual CFOs are known, then a much cleaner output vector may be achieved. A least squares (LS) approach is described herein, but any number of error minimization techniques may be used without departing from the scope and spirit of the invention. Any method of solving a linear set of equations may be employed that relates the hard decisions d to the soft symbol decisions s.

In this particular embodiment, as shown in a block 1910, the CFOs are estimated. In an alternative embodiment, some of the off-diagonal elements of the CFO matrix are set to zero as shown in a block 1915. For example, those elements whose values are below some threshold that is either predetermined or adaptive.

Then, a direct matrix inversion of the CFO matrix is performed as shown in a block 1920. The FIG. 19 shows an optimal way for correcting for the CFOs that is performed via a least-squares operation, in which a direct matrix inversion of the carrier offset matrix is performed (in the block 1920) and multiplied by the despread soft symbol decision vector to obtain the corrected soft symbol decisions, as shown in a block 1930. The corrected soft symbol decisions are then sliced to obtain the corresponding hard-decisions as follows (as shown in a block 1940):

$$\begin{bmatrix} \hat{d}_{1,k} \\ \hat{d}_{2,k} \\ \vdots \\ \hat{d}_{N,k} \end{bmatrix} = \text{slice}\left( \begin{bmatrix} a_{1,1} a_{1,2} \cdots a_{1,N} \\ a_{2,1} a_{2,2} \cdots a_{2,N} \\ \vdots \\ a_{N,1} a_{N,2} \cdots a_{N,N} \end{bmatrix}^{-1} \cdot \begin{bmatrix} s_{1,k} \\ s_{2,k} \\ \vdots \\ s_{N,k} \end{bmatrix} \right)$$

$$a_{i,j} = \sum_{n=1}^{N} c_i(n) c_j(n) e^{j(\omega_i n + N\omega_j(k-1))}$$

This least-squares technique perfectly corrects for the CFOs in one step. However, it requires a full matrix inversion operation, which may be too computationally complex for certain applications. However, for other embodiments, it may be operable and will provide an optimal solution.

FIG. 20 is an operational flow diagram illustrating an embodiment of a multi-user CFO correction method for CDMA using successive ICI canceling 2000 that is performed according to the invention. In the approach described within the FIG. 20, the matrix inversion operation is avoided as follows: a single-user correction is first performed on the despread soft symbol decisions. This approach may be viewed as the operations of the FIG. 18, and is shown pictorially in a block 2010. These initial estimates of the despread soft symbol decisions are then sliced to obtain initial hard-decisions (or initial iteration estimates of the hard decisions) as follows:

$$\hat{d}_{i,k}=\text{slice}(s_{i,k}/a_{i,i})$$

$$a_{i,i} = \sum_{n=1}^{N} e^{j(\omega_i n + N\omega_i(k-1))} \approx e^{j(N\omega_j(k-1/2))}$$

These initial hard-decisions are multiplied by the CFO coefficients to obtain an estimate for the undesired ICI (as shown in a block 2020). It is also noted that the determination of which CFO coefficients to employ may include using all of the elements of the CFO matrix or a sub-set of the CFO matrix. For example, there may be instances where the device that that performs multi-user CFO correction functionality for CDMA will not possess sufficient processing resources to employ all of the elements of the CFO matrix, and this will allow an implementation that employs less than all of the elements of the CFO matrix. The determination of a threshold that may be used to determine which CFO elements to employ and which to zero may be predetermined or adaptively identified. Moreover, when performing this recursive/iterative approach of multi-user CFO correction for CDMA, there may be some iterations that employ the partial CFO matrix and other iterations that employ the full CFO matrix. For example, the partial CFO matrix may be employed to perform macro-correction while the full CFO matrix may be employed to perform micro-correction. The decision of which CFO matrix to use, either the full CFO matrix or the partial CFO matrix, may be based on a predetermined approach or may be adaptively determined during the iterative correction operation.

Regardless of which approach is employed, using either a full CFO matrix, a partial CFO matrix approach, or a hybrid approach using full CFO matrix in some iterations and a partial CFO matrix in others, the undesired ICI is then subtracted from the despread soft symbol decisions to obtain cleaner soft symbol decisions (as shown in a block 2030). The cleaner soft symbol decisions are sliced as shown in a block 2040 to obtain next-order hard-decisions (or a second set of hard decisions) as follows:

$$s_{i,k}(r+1) = s_{i,k}(r) - \sum_{j=1}^{N} a_{i,j} \hat{d}_{j,k}(r)$$

$$\hat{d}_{i,k}(r) = \text{slice}(s_{i,k}(r))$$

where r is the iteration index.

This procedure can be repeated iteratively (r=1,2, . . . ) to enhance the accuracy of the obtained decisions in each step. The total number of iterations may be programmable; a predetermined number of iterations may be performed; the iterative operation may be terminated when convergence of a solution is reached; or some other criteria may be used to determine when to cease performing additional iterations. The procedure can also be restricted to correct for dominant CFOs only to further reduce complexity. It is noted here that the approach of the FIG. 19 generally has a better performance than the iterative technique shown here in the FIG. 20. However, the approach of the FIG. 20 is much less complex as it avoids the matrix inversion operation altogether. Using this technique within the FIG. 20, in conjunction with the technique described in the FIG. 18, the invention is operable to provide for significant ICI correction in the presence of CFOs, has a much higher accuracy than single-user CFOs approaches, and is significantly less complex in implementation.

It is also noted that the methods described within the FIGS. 18, 19, and 20 may be performed within any of the systems described in the Figures preceding them. A variety of devices may perform the methods according to the invention. For example, in the many functional blocks described in the system embodiments of the invention, the functionality of despreading, slicing, multiplying, subtracting, decoding, and processing may all be supported or partially be supported as required in the particular embodiment.

In view of the above detailed description of the invention and associated drawings, other modifications and variations will now become apparent. It should also be apparent that such other modifications and variations may be effected without departing from the spirit and scope of the invention.

What is claimed is:

1. A multi-user carrier frequency offset correction method for a code division multiple access signal, the method comprising:
   slicing a first plurality of despread soft symbol decisions of a code division multiple access signal thereby generating a first plurality of hard decisions;
   multiplying the first plurality of hard decisions by a plurality of carrier frequency offset coefficients thereby obtaining an estimate of inter-code-interference within the code division multiple access signal;
   subtracting the estimate of inter-code-interference from the first plurality of despread soft symbol decisions thereby obtaining a second plurality of despread soft symbol decisions; and
   slicing the second plurality of despread soft symbol decisions thereby generating a second plurality of hard decisions.

2. The method of claim 1, further comprising:
   decoupling the first plurality of despread soft symbol decisions for a corresponding plurality of codes that is used to decode a code division multiple access signal by initially ignoring any carrier frequency offset contribution between the codes of the plurality of codes; and
   independently correcting each soft symbol decision using only the carrier frequency offset contribution for each corresponding code and soft symbol decision of the first plurality of despread soft symbol decisions.

3. The method of claim 1, wherein the method is performed within a soft symbol decision processor of a communication receiver.

4. The method of claim 1, further comprising:
   comparing each of the carrier frequency offset coefficients within the plurality of carrier frequency offset coefficients to a threshold; and
   zeroing those carrier frequency offset coefficients within the plurality of carrier frequency offset coefficients that fail to exceed the threshold.

5. The method of claim 4, further comprising adaptively determining the threshold.

6. The method of claim 4, wherein the threshold is predetermined.

7. The method of claim 1, further comprising multiplying the first plurality of hard decisions by a sub-plurality of carrier frequency offset coefficients thereby obtaining the estimate of inter-code-interference within the code division multiple access signal; and
   wherein the sub-plurality of carrier frequency offset coefficients comprises a sub-set of the carrier frequency offset coefficients within the plurality of carrier frequency offset coefficients; and
   each carrier frequency offset coefficient of the sub-plurality of carrier frequency offset coefficients exceeds a threshold.

8. The method of claim 7, further comprising adaptively determining the threshold.

9. The method of claim 7, wherein the threshold is predetermined.

10. The method of claim 1, wherein the method is performed within at least one of a headend physical layer burst receiver, multi-channel headend physical layer burst receiver, a base station receiver, a mobile receiver, a satellite earth station, a tower receiver, a high definition television set top box receiver, a cable modem termination system, and a transceiver.

11. The method of claim 1, wherein the method is performed within a headend physical layer burst receiver; and
   the headend physical layer burst receiver is communicatively coupled to a cable modem termination system medium access controller.

12. A multi-user carrier frequency offset correction method for a code division multiple access signal, the method comprising:
   generating a plurality of despread soft symbol decisions for a corresponding plurality of codes from a code division multiple access signal;

generating a carrier frequency offset matrix that includes carrier frequency offset contributions between each of the codes within a plurality of codes;

inverting the carrier frequency offset matrix;

multiplying the inverted carrier frequency offset matrix by the plurality of despread soft symbol decisions thereby generating a corrected plurality of despread soft symbol decisions; and slicing the corrected plurality of despread soft symbol decisions thereby generating a corrected plurality of hard decisions.

13. The method of claim 12, wherein the method is performed within a soft symbol decision processor of a communication receiver.

14. The method of claim 12, wherein the carrier frequency offset matrix is generated using a preamble of the code division multiple access signal.

15. The method of claim 12, wherein the carrier frequency offset matrix comprises a sub-set of the carrier frequency offset contributions between each of the codes within the plurality of codes; and the sub-set comprises those carrier frequency offset contributions that exceed a threshold.

16. The method of claim 15, further comprising adaptively determining the threshold.

17. The method of claim 15, wherein the threshold is predetermined.

18. The method of claim 12, wherein the method is performed within at least one of a headend physical layer burst receiver, a multi-channel headend physical layer burst receiver, a base station receiver, a mobile receiver, a satellite earth station, a tower receiver, a high definition television set top box receiver, a cable modem termination system, and a transceiver.

19. The method of claim 12, wherein the method is performed within a headend physical layer burst receiver; and the headend physical layer burst receiver is communicatively coupled to a cable modem termination system medium access controller.

20. A multi-user carrier frequency offset correction method for a code division multiple access signal, the method comprising:

decoupling a first plurality of despread soft symbol decisions for a corresponding plurality of codes that is used to decode the code division multiple access signal by initially ignoring any carrier frequency offset contribution between the codes of the plurality of codes;

independently correcting each despread soft symbol decision within the first plurality of despread soft symbol decisions using only the carrier frequency offset contribution for each corresponding code and despread soft symbol decision within the first plurality of despread soft symbol decisions;

slicing the corrected first plurality of despread soft symbol decisions thereby generating a first plurality of hard decisions;

multiplying the corrected first plurality of hard decisions by a plurality of carrier frequency offset coefficients thereby obtaining an estimate of inter-code-interference between the codes of the plurality of codes within the code division multiple access signal;

subtracting the estimate of inter-code-interference from the corrected first plurality of despread soft symbol decisions thereby obtaining a corrected second plurality of despread soft symbol decisions; and slicing the corrected second plurality of despread soft symbol decisions thereby generating a second plurality of hard decisions.

21. The method of claim 20, further comprising:

multiplying the corrected second plurality of hard decisions by the plurality of carrier frequency offset coefficients thereby obtaining at least one additional estimate of inter-code-interference between the codes of the plurality of codes within the code division multiple access signal;

subtracting the at least one additional estimate of inter-code-interference from the corrected second plurality of despread soft symbol decisions thereby obtaining a corrected third plurality of despread soft symbol decisions; and slicing the corrected third plurality of despread soft symbol decisions thereby generating a third plurality of hard decisions.

22. The method of claim 20, wherein the plurality of carrier frequency offset coefficients is generated using a preamble of the code division multiple access signal.

23. The method of claim 20, further comprising:

comparing each of the carrier frequency offset coefficients within the plurality of carrier frequency offset coefficients to a threshold; and zeroing those carrier frequency offset coefficients within the plurality of carrier frequency offset coefficients that fail to exceed the threshold before multiplying the plurality of hard decisions by the plurality of carrier frequency offset coefficients.

24. The method of claim 23, further comprising adaptively determining the threshold.

25. The method of claim 23, wherein the threshold is predetermined.

26. The method of claim 20, wherein the method is performed within at least one of a headend physical layer burst receiver, a multi-channel headend physical layer burst receiver, a base station receiver, a mobile receiver, a satellite earth station, a tower receiver, a high definition television set top box receiver, a cable modem termination system, and a transceiver.

27. The method of claim 20, wherein the method is performed within a headend physical layer burst receiver; and the headend physical layer burst receiver is communicatively coupled to a cable modem termination system medium access controller.

28. A multi-user carrier frequency offset correction method for a code division multiple access signal, the method comprising:

decoupling a plurality of despread soft symbol decisions for a corresponding plurality of codes that is used to decode a code division multiple access signal by initially ignoring any carrier frequency offset contribution between the codes of the plurality of codes;

independently correcting for each soft symbol decision using only the carrier frequency offset contribution for each corresponding code and soft symbol decision; and slicing the corrected plurality of despread soft symbol decisions thereby generating a plurality of hard decisions.

29. The method of claim 28, further comprising:

multiplying the plurality of hard decisions by a plurality of carrier frequency offset coefficients thereby obtaining an estimate of inter-code-interference within the code division multiple access signal;

subtracting the estimate of inter-code-interference from the plurality of despread soft symbol decisions thereby obtaining a cleaner plurality of despread soft symbol decisions; and slicing the cleaner plurality of despread soft symbol decisions thereby generating a cleaner plurality of hard decisions.

30. The method of claim 29, further comprising:
comparing each of the carrier frequency offset coefficients within the plurality of carrier frequency offset coefficients to a threshold; and zeroing those carrier frequency offset coefficients within the plurality of carrier frequency offset coefficients that fail to exceed the threshold before multiplying the plurality of hard decisions by the plurality of carrier frequency offset coefficients.

31. The method of claim 30, further comprising adaptively determining the threshold.

32. The method of claim 30, wherein the threshold is predetermined.

33. The method of claim 29, further comprising:
multiplying the corrected second plurality, of hard decisions by the plurality of carrier frequency offset coefficients thereby obtaining at least one additional estimate of inter-code-interference between the codes of the plurality of codes within the code division multiple access signal;

subtracting the at least one additional estimate of inter-code-interference from the corrected second plurality of despread soft symbol decisions thereby obtaining a corrected third plurality of despread soft symbol decisions; and slicing the corrected third plurality of despread soft symbol decisions thereby generating a third plurality of hard decisions.

34. The method of claim 33, further comprising:
comparing each of the carrier frequency offset coefficients within the plurality of carrier frequency offset coefficients to a threshold; and zeroing those carrier frequency offset coefficients within the plurality of carrier frequency offset coefficients that fail to exceed the threshold before multiplying the corrected second plurality of hard decisions by the plurality of carrier frequency offset coefficients.

35. The method of claim 34, further comprising adaptively determining the threshold.

36. The method of claim 34, wherein the threshold is predetermined.

37. The method of claim 28, wherein the method is performed within at least one of a multi-channel headend physical layer burst receiver, a base station receiver, a mobile receiver, a satellite earth station, a tower receiver, a high definition television set top box receiver, a cable modem termination system, and a transceiver.

38. The method of claim 28, wherein the method is performed within a headend physical layer burst receiver; and the headend physical layer burst receiver is communicatively coupled to a cable modem termination system medium access controller.

39. A communication receiver that is operable to perform multi-user carrier frequency offset correction on a code division multiple access signal, the communication receiver comprising:

a code division multiple access despreader that is operable to despread a plurality of codes the code division multiple access signal;

a modulation despreader, communicatively coupled to the code division multiple access despreader, that is operable to despread a plurality of modulations of a plurality of symbols within the code division multiple access signal;

a soft symbol decision correction processor, communicatively coupled to the modulation despreader, that is operable to correct for carrier frequency offset within the code division multiple access signal, the soft symbol decision correction processor comprises a hard decision estimator and an inter-code-interference estimator; and a forward error correction processor, communicatively coupled to the soft symbol decision correction processor, that is operable to perform soft symbol decision decoding; and wherein the hard decision estimator generates employs a first plurality of despread soft symbol decisions, from an output of the modulation despreader, to generate a first plurality of hard decisions; and the inter-code-interference estimator multiplies the first plurality of hard decisions by a plurality of carrier frequency offset coefficients to obtain an estimate of inter-code-interference within the code division multiple access signal;

the soft symbol decision correction processor subtracts the estimate of inter-code-interference from the first plurality of despread soft symbol decisions to obtain a second plurality of despread soft symbol decisions; and the forward error correction processor slices the second plurality of despread soft symbol decisions to generate a second plurality of hard decisions.

40. The communication receiver of claim 39, further comprising a preamble processor, communicatively coupled to the modulation despreader and the soft symbol decision correction processor, that is operable to generate the plurality of carrier frequency offset coefficients from, a preamble of the code division multiple access signal.

41. The communication receiver of claim 39, wherein the plurality of carrier frequency offset coefficients comprises a carrier frequency offset matrix; and the soft symbol decision correction processor is operable to perform direct matrix inversion of the carrier frequency offset matrix.

42. The communication receiver of claim 41, wherein the plurality of carrier frequency offset coefficients comprises only those carrier frequency offset coefficients that exceed a threshold.

43. The communication receiver of claim 42, wherein the threshold is adaptively determined.

44. The communication receiver of claim 42, wherein the threshold is predetermined.

45. The communication receiver of claim 39, wherein the communication receiver comprises at least one of a headend physical layer burst receiver, a multi-channel headend physical layer burst receiver, a base station receiver, a mobile receiver, a satellite earth station, a tower receiver, a high definition television set top box receiver, a cable modem termination system, and a transceiver.

46. The communication receiver of claim 39, wherein the communication receiver comprises a headend physical layer burst receiver; and the headend physical layer burst receiver is communicatively coupled to a cable modem termination system medium access controller.

47. A communication receiver that is operable to perform multi user carrier frequency offset correction on a code division multiple access signal, the communication receiver comprising:
- a code division multiple access despreader that is operable to despread a plurality of codes of the code division multiple access signal;
- a modulation despreader, communicatively coupled to the code division multiple access despreader, that is operable to despread a plurality of modulations of a plurality of symbols within the code division multiple access signal;
- a soft symbol decision correction processor, communicatively coupled to the modulation despreader, that is operable to correct for carrier frequency offset within the code division multiple access signal, the soft symbol decision correction processor comprises a hard decision estimator and an inter-code-interference estimator; and
- a forward error correction processor, communicatively coupled to the soft symbol decision correction processor, that is operable to perform soft symbol decision decoding; and
- wherein the soft symbol decision correction processor decouples a first plurality of despread soft symbol decisions for a corresponding plurality of codes that is used to decode the code division multiple access signal by initially ignoring any carrier frequency offset contribution between the codes of the plurality of codes; and
- the soft symbol decision correction processor corrects each soft symbol decision using only the carrier frequency offset contribution for each corresponding code and soft symbol decision thereby generating a corrected first plurality of soft symbol decisions;
- the hard decision estimator employs the corrected first plurality of soft symbol decisions to generate a first plurality of hard decisions; and
- the inter-code-interference estimator multiplies the first plurality of hard decisions by a plurality of carrier frequency offset coefficients to obtain an estimate of inter-code-interference within the code division multiple access signal;
- the soft symbol decision correction processor subtracts the estimate of inter-code-interference from the corrected first plurality of despread soft symbol decisions to obtain a corrected second plurality of despread soft symbol decisions; and
- the forward error correction processor slices the corrected second plurality of despread soft symbol decisions to generate a second plurality of hard decisions.

48. The communication receiver of claim 47, wherein the plurality of carrier frequency offset coefficients comprises only those carrier frequency offset coefficients that exceed a threshold.

49. The communication receiver of claim 48, wherein the threshold is adaptively determined.

50. The communication receiver of claim 48, wherein the threshold is predetermined.

51. The communication receiver of claim 47, wherein:
- the inter-code-interference estimator multiples the corrected second plurality of hard decisions by the plurality of carrier frequency offset coefficients thereby obtaining at least one additional estimate of inter-code-interference between the codes of the plurality of codes within the code division multiple access signal;
- the soft symbol decision correction processor subtracts the at least one additional estimate of inter-code-interference from the corrected second plurality of despread soft symbol decisions thereby obtaining a corrected third plurality of despread soft symbol decisions; and
- the forward error correction processor slices the corrected third plurality of despread soft symbol decisions to generate a third plurality of hard decisions.

52. The communication receiver of claim 51, wherein the plurality of carrier frequency offset coefficients comprises only those carrier frequency offset coefficients that exceed a threshold.

53. The communication receiver of claim 52, wherein the threshold is adaptively determined.

54. The communication receiver of claim 52, wherein the threshold is predetermined.

55. The communication receiver of claim 47, wherein the plurality of carrier frequency offset coefficients comprises a carrier frequency offset matrix; and
- the soft symbol decision correction processor is operable to perform direct matrix inversion of the carrier frequency offset matrix.

56. The communication receiver of claim 47, wherein the communication receiver comprises at least one of a headend physical layer burst receiver, a multi-channel headend physical layer burst receiver, a base station receiver, a mobile receiver, a satellite earth station, a tower receiver, a high definition television set top box receiver, a cable modem termination system, and a transceiver.

57. The communication receiver of claim 47, wherein the communication receiver comprises a headend physical layer burst receiver; and
- the headend physical layer burst receiver is communicatively coupled to a cable modem termination system medium access controller.

* * * * *

UNITED STATES PATENT AND TRADEMARK OFFICE
CERTIFICATE OF CORRECTION

PATENT NO. : 7,313,122 B2  Page 1 of 1
APPLICATION NO. : 10/225963
DATED : December 25, 2007
INVENTOR(S) : Nabil Yousef et al.

It is certified that error appears in the above-identified patent and that said Letters Patent is hereby corrected as shown below:

Title Page, ABSTRACT, line 1: replace ""Multiple" with --Multiple--

Title Page, ABSTRACT, line 4: after "manner" delete "CDM."

Title Page, ABSTRACT, line 4: after "manner" insert --.--

Title Page, ABSTRACT, line 12: after "decisions" delete "so,"

Title Page, ABSTRACT, line 12: after "decisions" insert --,--

Title Page, ABSTRACT, line 13: after "approach" insert --,--

Title Page, ABSTRACT, line 18: replace "slicing."" with --slicing.--

Column 26, line 17, in Claim 39: after "estimator" delete "generates"

Column 26, line 38, in Claim 40: replace "from," with --from--

Column 27, line 2, in Claim 47: replace "multi user" with --multi-user--

Signed and Sealed this

Twelfth Day of August, 2008

JON W. DUDAS
*Director of the United States Patent and Trademark Office*